May 30, 1967
R. L. BAILEY
3,321,954
CONTAMINANT DETECTION APPARATUS
Filed July 20, 1966
14 Sheets-Sheet 3
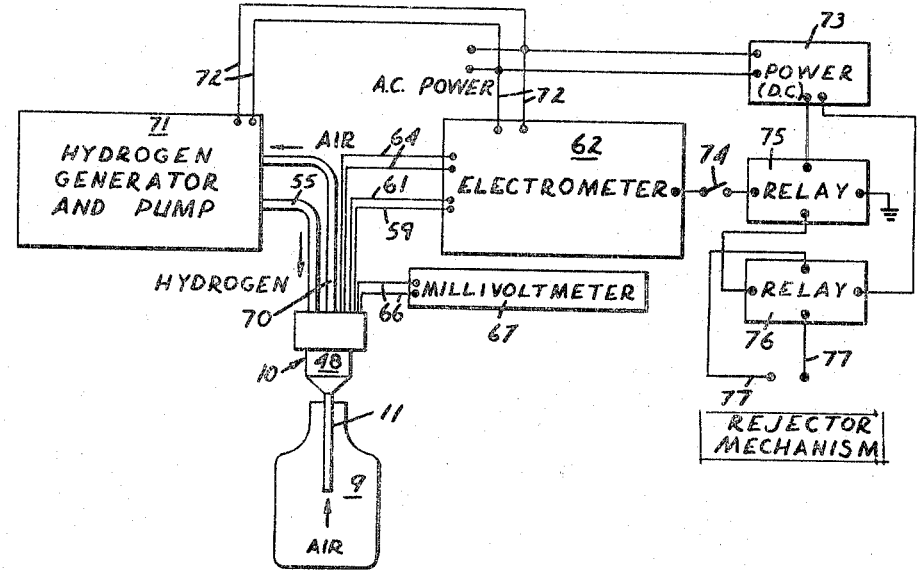
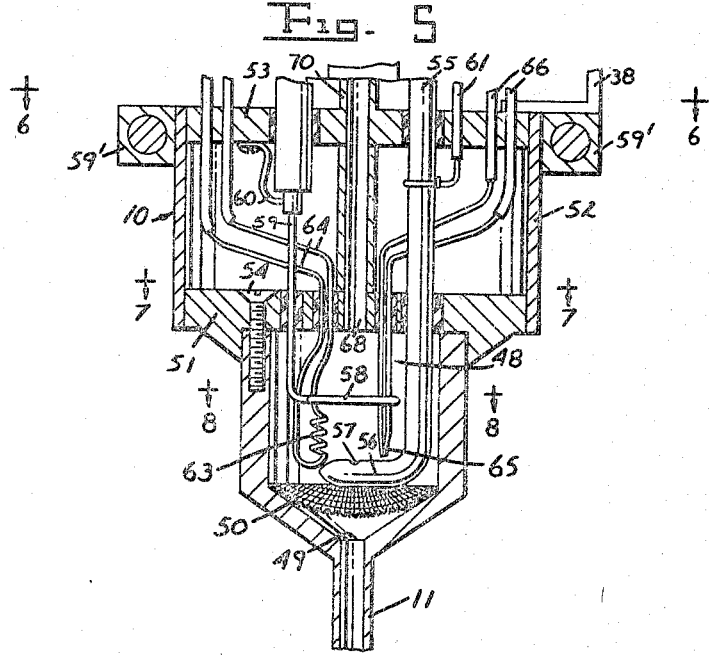
INVENTOR.
ROBERT L. BAILEY

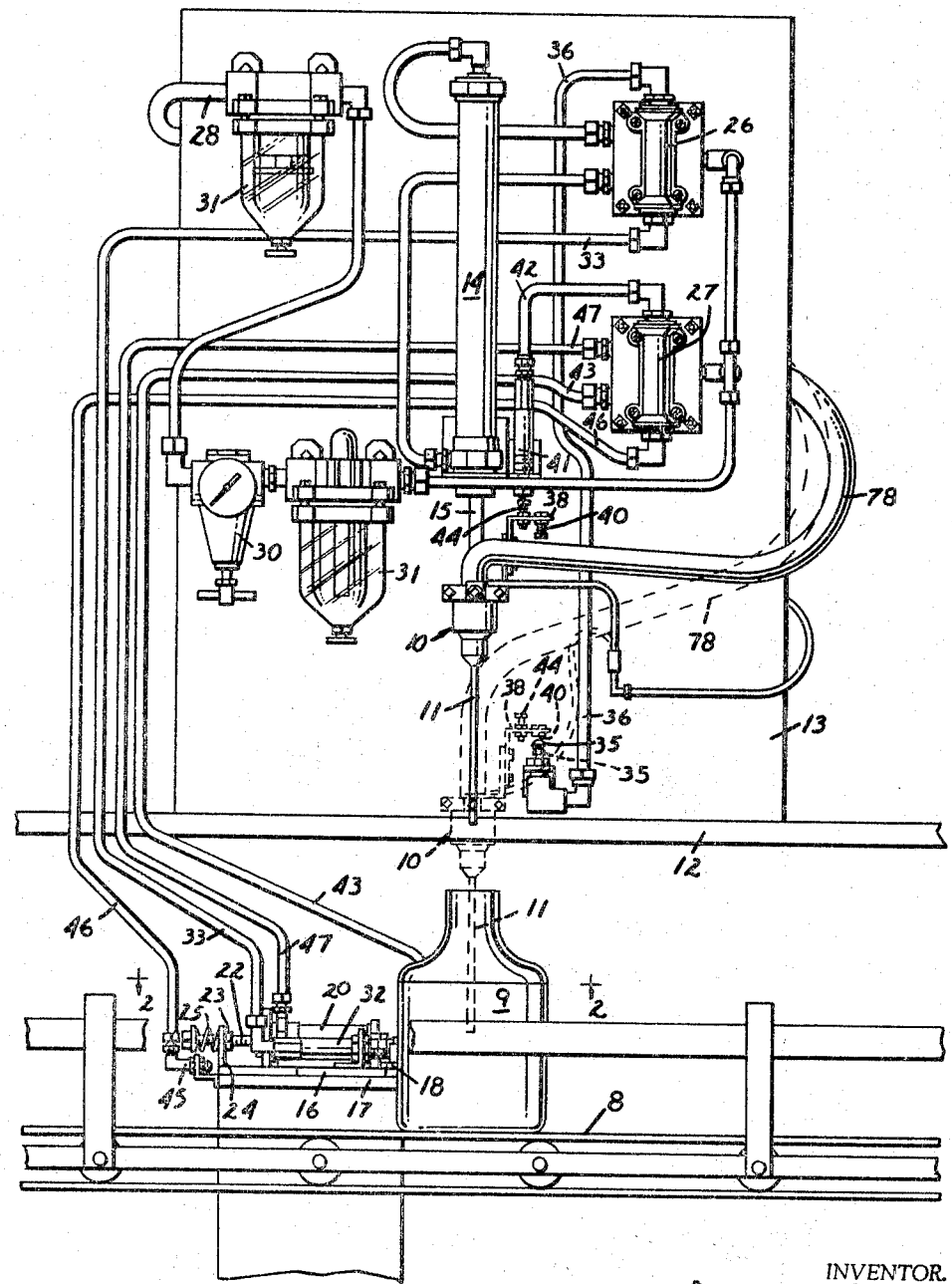

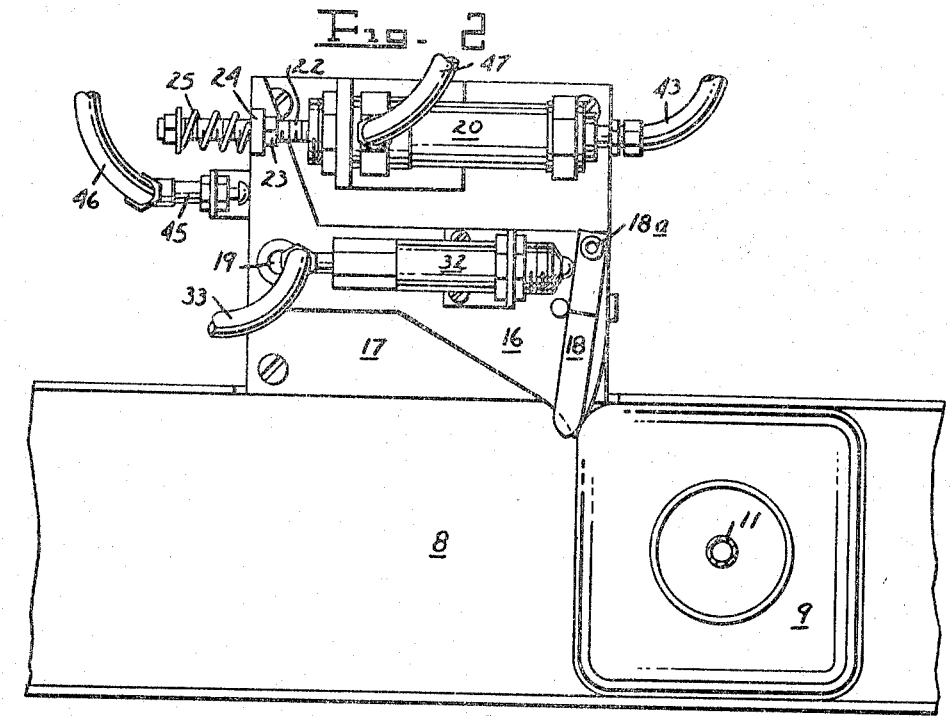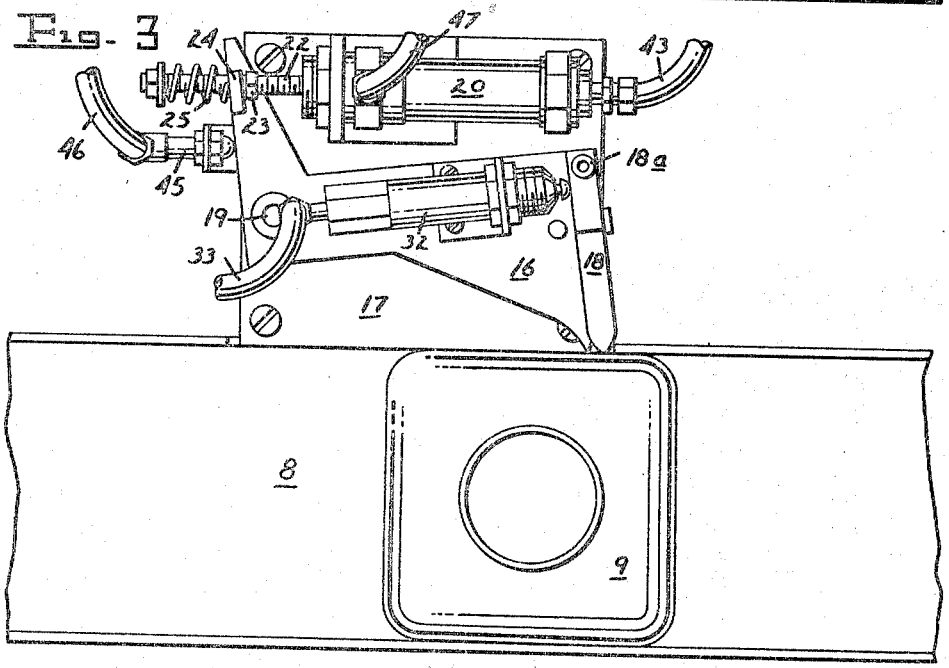

INVENTOR.
ROBERT L. BAILEY

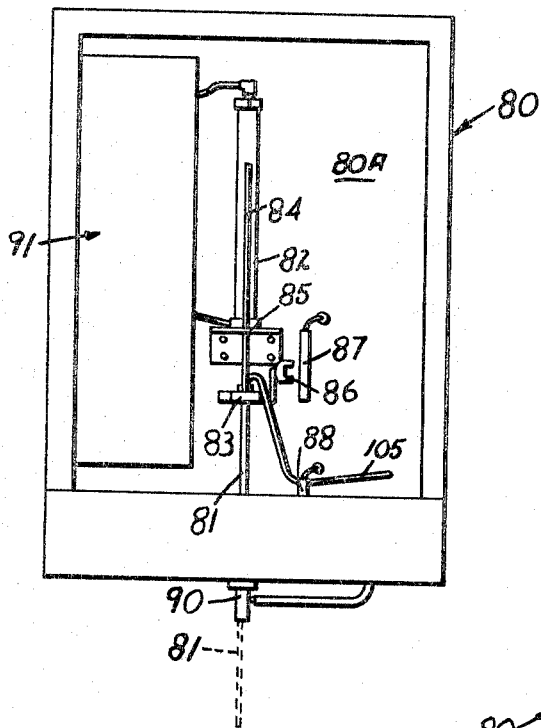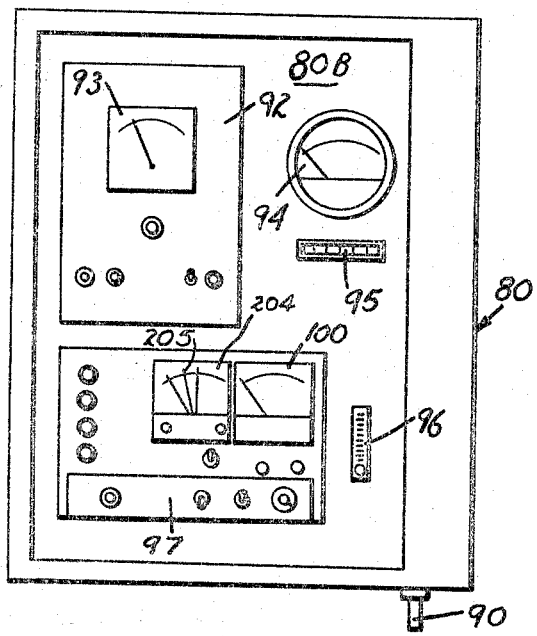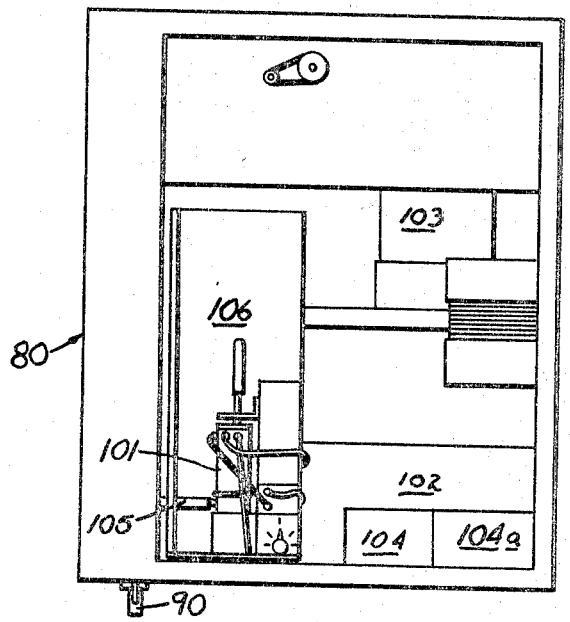

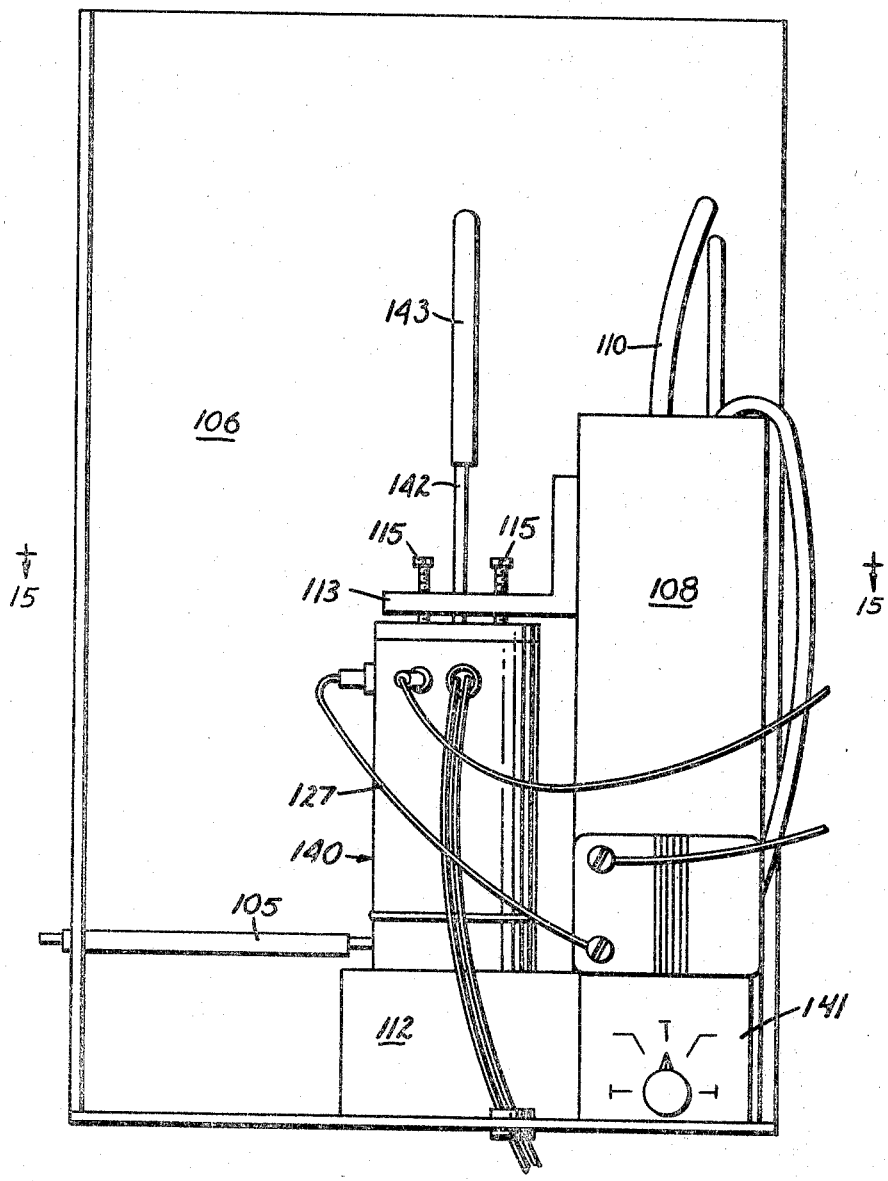

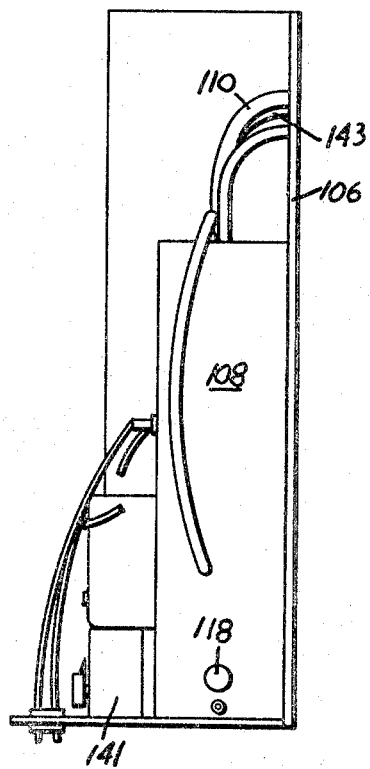
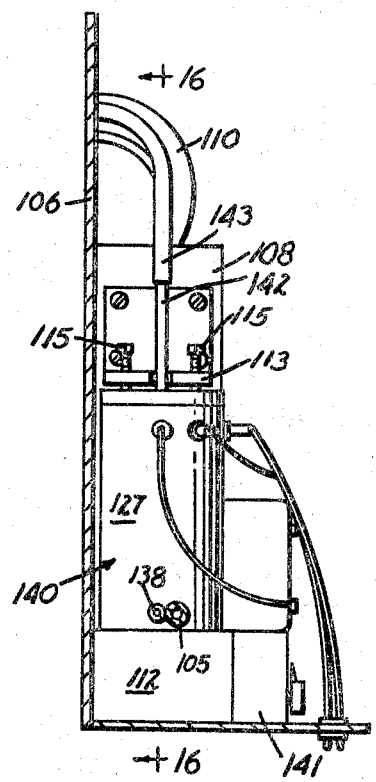
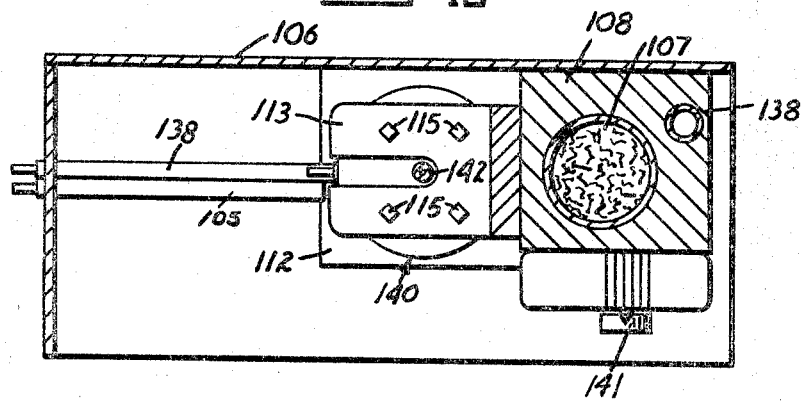

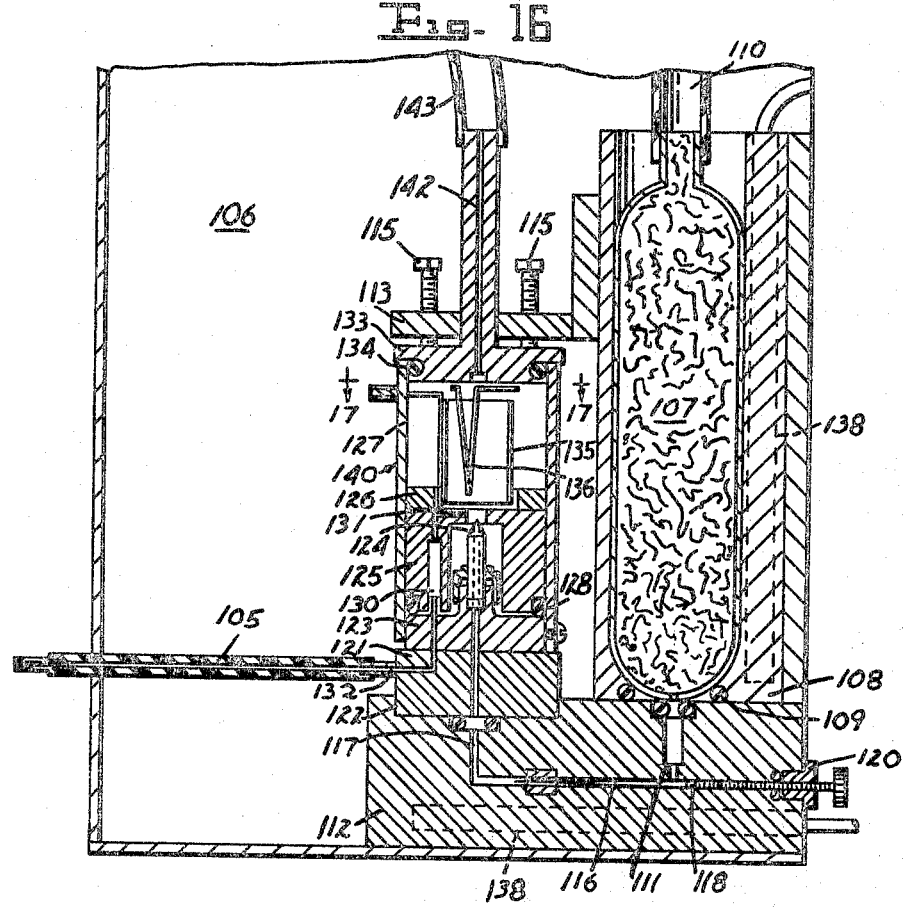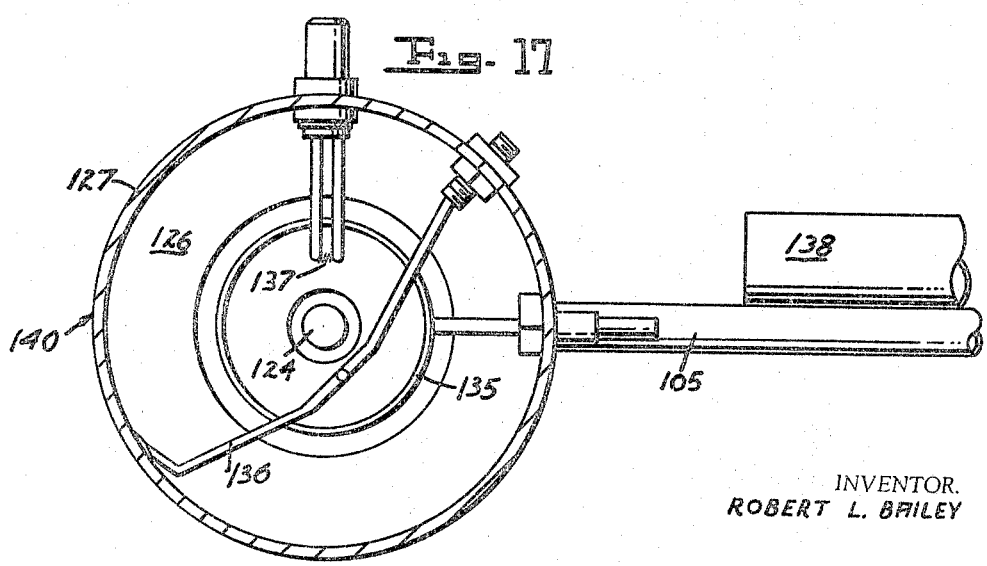

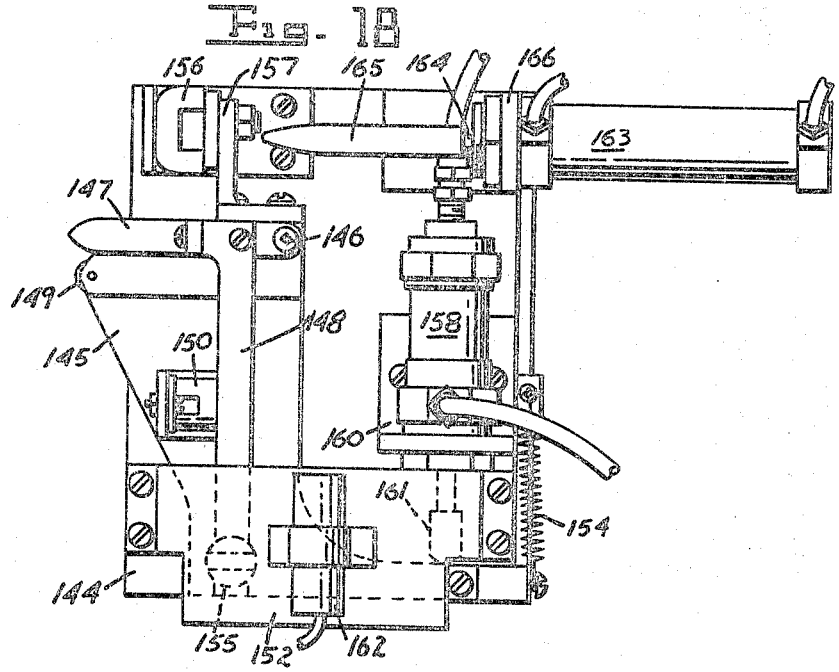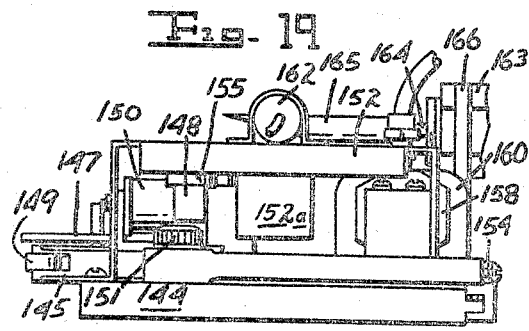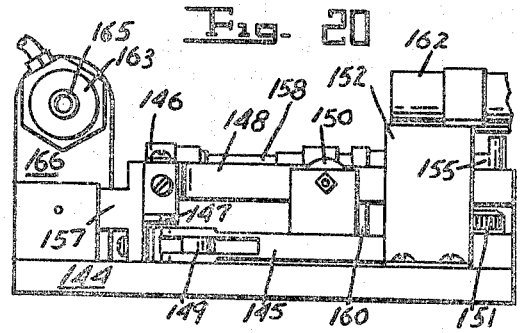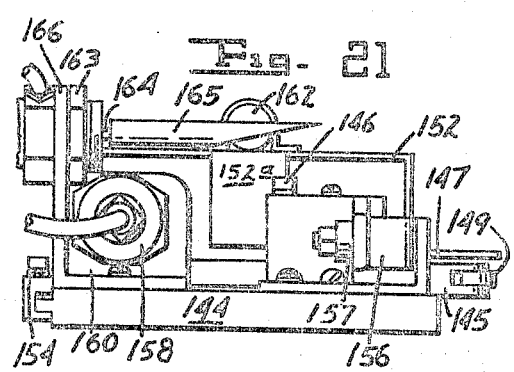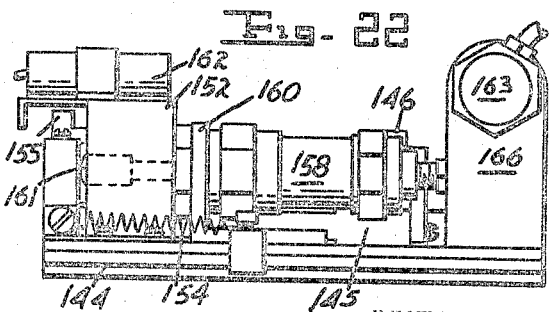

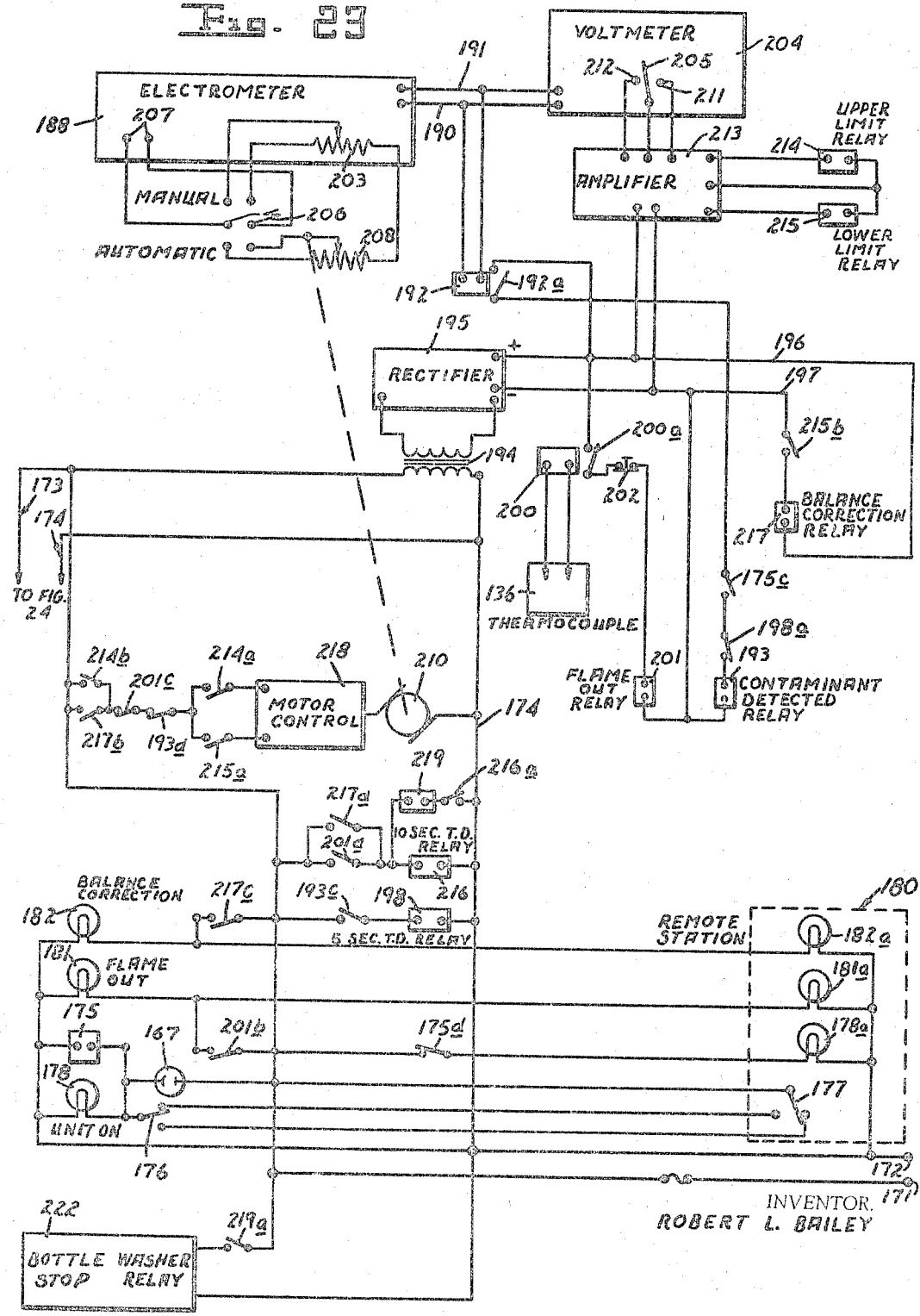

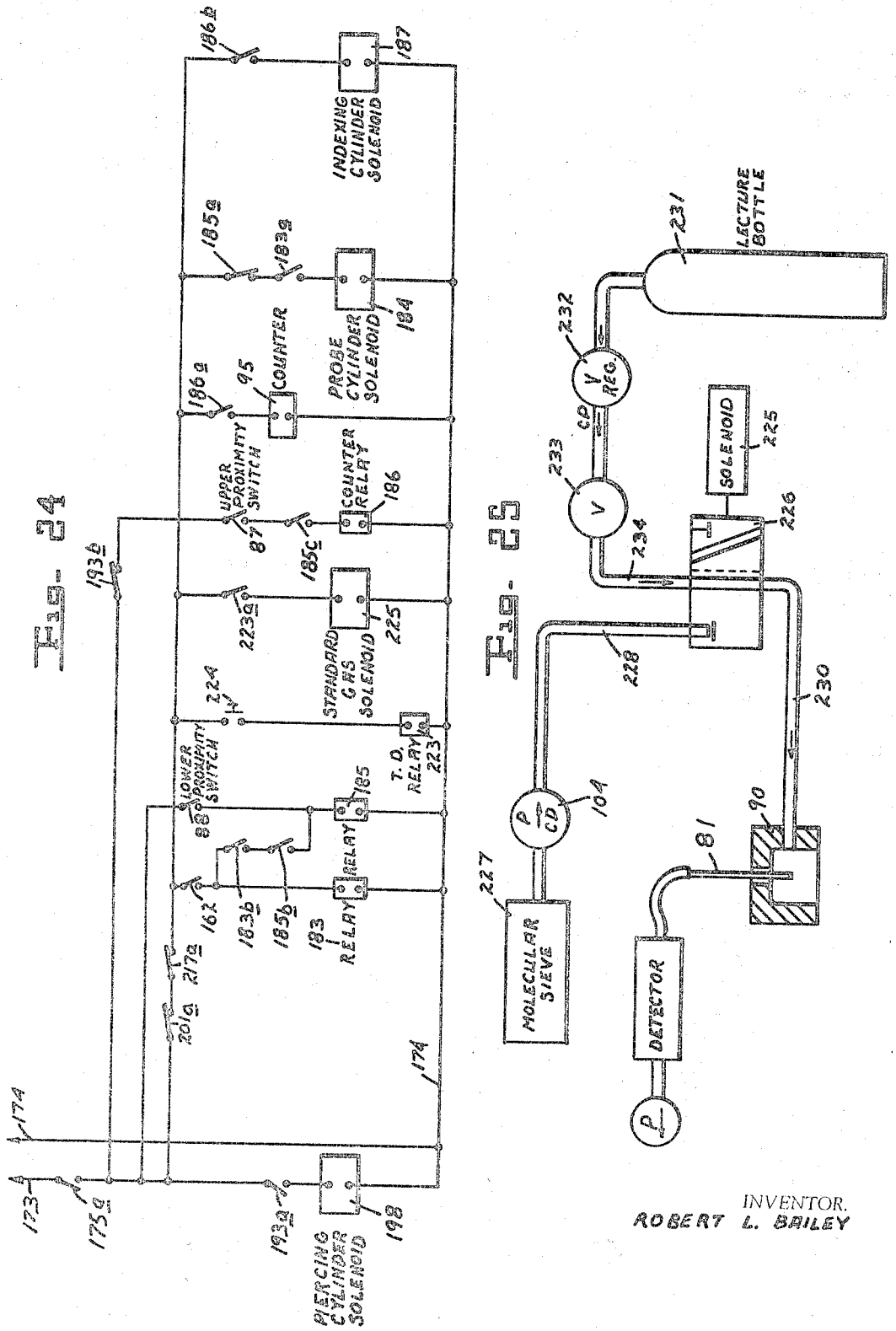

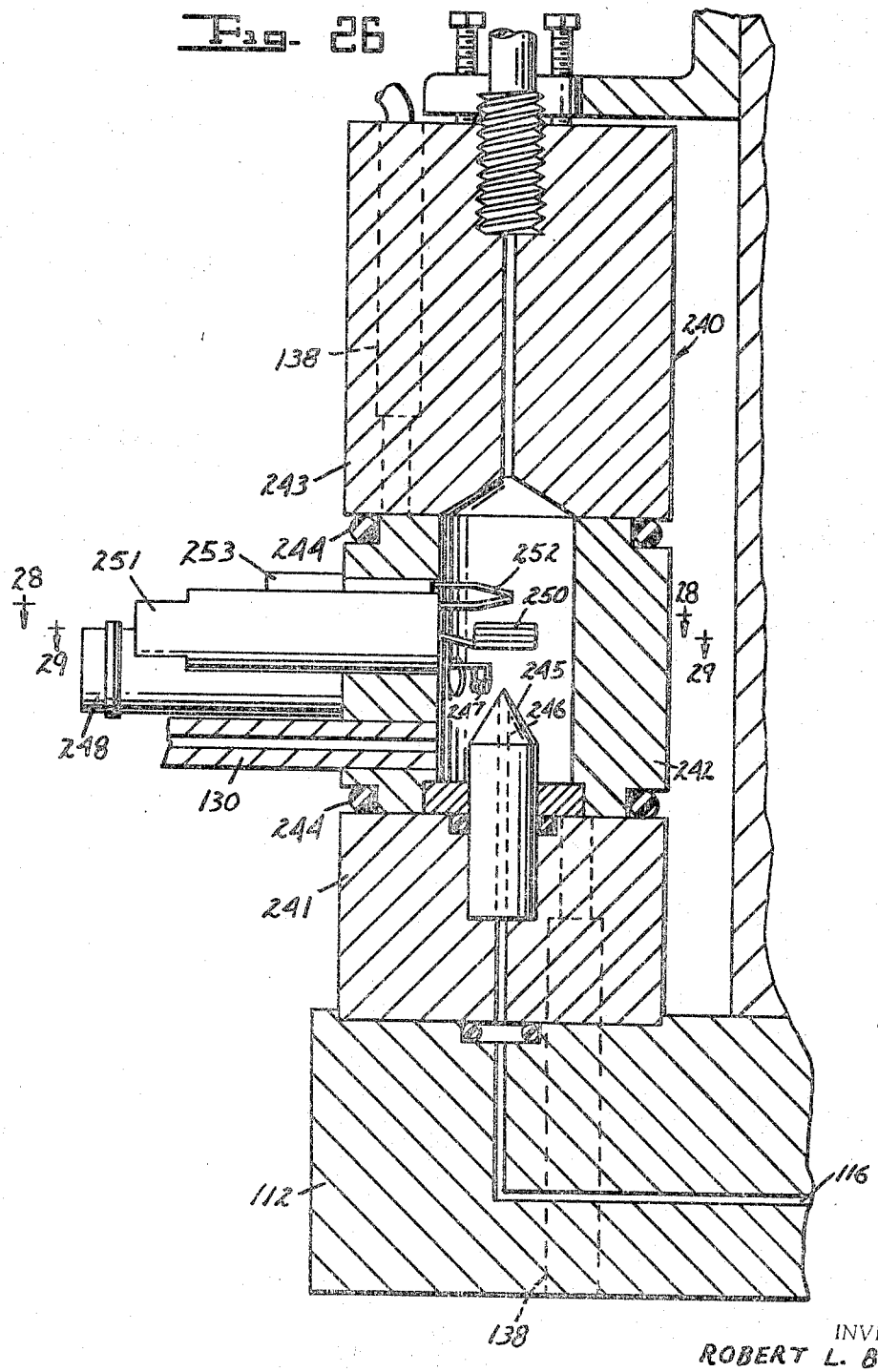

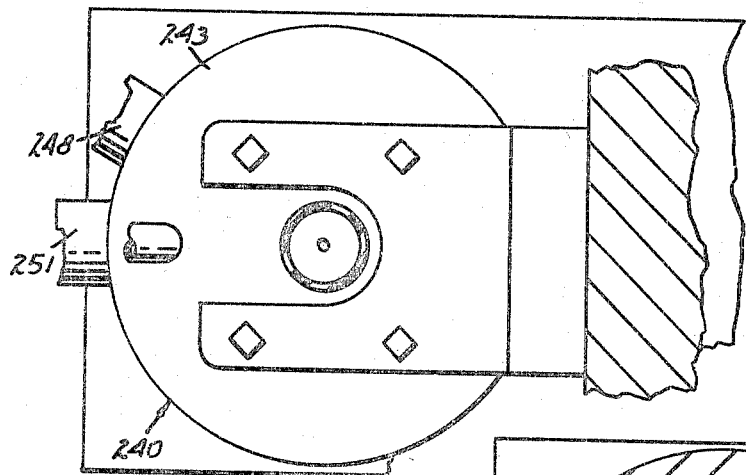
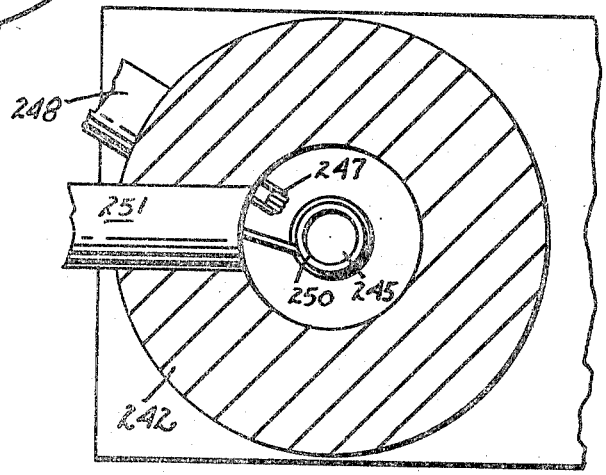
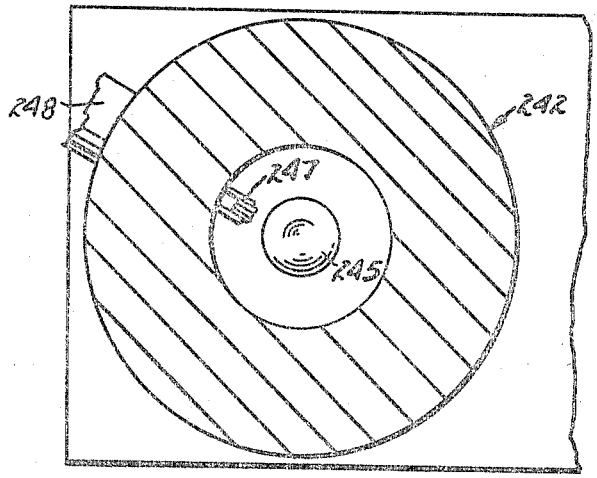

May 30, 1967  R. L. BAILEY  3,321,954
CONTAMINANT DETECTION APPARATUS
Filed July 20, 1966  14 Sheets-Sheet 14

INVENTOR.
ROBERT L. BAILEY

United States Patent Office 3,321,954
Patented May 30, 1967

3,321,954
CONTAMINANT DETECTION APPARATUS
Robert L. Bailey, Spokane, Wash., assignor to National Distillers and Chemical Corporation, New York, N.Y.
Filed July 20, 1966, Ser. No. 566,671
11 Claims. (Cl. 73—23)

This application is a continuation-in-part of my copending application Serial No. 373,310, filed June 8, 1964 for Method for Detecting Volatile Organic Contaminants in Containers, now Patent 3,266,292.

The invention described herein relates to an apparatus for detecting the presence of contaminants in bottles, jars or similar containers, including the necessary mechanical, electronic and control elements required in a production unit for testing containers moving along a continuous conveyor.

The apparatus described herein is primarily concerned with the detection of organic vapors given off by residual contaminants within containers such as jars or bottles having a confined interior area. More specifically, although the invention is not to be restricted to one field, the device is adapted for use in detecting the presence of organic contaminant substances in reusable plastic milk bottles in the short period of time between the washing of the bottles and the subsequent filling of each bottle with milk. The necessity of the present apparatus arises due to the possible use of such containers by consumers for the storage of organic solvents, gasoline and similar materials. In some instances, residual traces of the contaminant will remain in the bottle after it has been washed. Such traces, if undetected, will often affect the taste of milk in the container. The present device provides a production apparatus by which such contaminants can be detected within bottles so that the bottles will not be refilled with a food substance.

The present apparatus successively draws a sample of atmosphere from each bottle. The samples are each tested by burning in a hydrogen flame within a detection cell, thereby ionizing foreign substances in each sample. The ionization of the foreign substances is detected by an electrometer, which in turn selectively operates a rejection mechanism to prevent refilling of contaminated bottles.

The testing apparatus is fully automatic and adapted to continuously test successive bottles moving along a conveyor, typically between a bottle washing apparatus and a bottle filling machine. The control devices insure that the apparatus will always be in operation when the type of bottle to be tested passes the testing station and is interlocked with other machines in the assembly so that a malfunction in the testing apparatus will shut down the associated equipment. The apparatus also includes an automatic balancing adjustment to compensate for drift within the electrometer, designed to insure constant sensitivity of the testing device to a standard desired by health authorities. To check the device, a sample of standard contaminated gas can be selectively injected through the testing device at desired intervals. Should the apparatus become temporarily unbalanced or otherwise ineffective, the container being tested is not permitted to pass the testing machine on the moving conveyor until it has been subjected to a complete testing cycle. The detection cell within which the atmosphere sample is burned is incorporated in an apparatus warmed to a constant temperature so as to prevent vapors from condensing within this area of the apparatus.

A first object of this invention is to provide an effective automatic atmosphere sampling and testing apparatus for containers moving past the apparatus on a continuous conveyor so that the user of the containers can be assured of proper testing of each container. To insure such operation, the controlling circuits and devices are designed to either compensate automatically for deviation of component operation or to shut down the apparatus and associated equipment until manual correction has been effected.

Another object of this invention is to provide a simple mechanical apparatus whereby a sample of atmosphere can be drawn from successive moving containers in a rapid sequence, each sample being individually tested to detect the presence of contaminating vapors. The speed of the apparatus is such as to make it compatible with existing container handling equipment.

Another object of this invention is to provide a testing apparatus which will be activated at any time when the containers to be tested are passing the area of the testing elements. This is particularly important when a mixture of containers are being run along a conveyor. In particular, testing of plastic bottles is assured even though they are mixed with glass bottles.

Another object of this invention is to provide such a testing apparatus which is readily adaptable to any existing container line, such as the conveyor commonly used in dairies between a bottle washer and a bottle filling machine. The present apparatus can be set directly above such a conveyor and placed in use without disrupting normal conveyor operation.

These and further objects will be evident from a study of the following disclosure, taken together with the accompanying drawings which illustrate in detail one preferred structure. It is to be understood that this structure is not intended to limit or restrict the scope of the invention, which is set out in the claims that follow.

In the drawings:

FIGURE 1 is a front view of the complete apparatus showing the device with the sensing apparatus in its retracted position, the inserted or extended position of the sensing apparatus being illustrated in dashed lines;

FIGURE 2 is an enlarged sectional view taken along line 2—2 in FIGURE 1;

FIGURE 3 is a view similar to FIGURE 2 showing the passage of bottles past the stop mechanism;

FIGURE 4 is a schematic diagram showing the various components utilized in the sensing apparatus;

FIGURE 5 is a vertical cross-sectional view taken through the sensing cell;

FIGURE 9 is a front view of a modified form of the testing apparatus;

FIGURE 10 is a side view of the apparatus shown in FIGURE 9, as seen from the right;

FIGURE 11 is a side view opposite FIGURE 10;

FIGURE 12 is an enlarged side elevation view of the detection cell assembly as seen in FIGURE 10;

FIGURE 13 is a side elevation view, at a reduced scale, taken from the right in FIGURE 12;

FIGURE 14 is a side elevation view taken oppositely to FIGURE 13;

FIGURE 15 is a section view of the apparatus shown in FIGURE 12 as seen along line 15—15;

FIGURE 16 is a sectional view taken along line 16—16 in FIGURE 14;

FIGURE 17 is an enlarged sectional view through the detection cell as seen along line 17—17 in FIGURE 16;

FIGURE 18 is a top view of a modified form of the stop mechanism that controls movement of the passing bottles;

FIGURE 19 is an end elevation view taken from the bottom of FIGURE 18;

FIGURE 20 is a side elevation view taken from the left in FIGURE 18;

FIGURE 21 is an end elevation view opposite to FIGURE 19;

FIGURE 22 is a side elevation view opposite to FIGURE 20;

FIGURE 23 is a somewhat schematic diagram showing the electrical circuitry associated with the modified detection apparatus and container stop mechanism illustrated in FIGURES 9 through 22;

FIGURE 24 is a schematic wiring diagram showing the controls used for the pneumatic mechanisms of the apparatus;

FIGURE 25 is a schematic diagram showing the pneumatic circuitry associated with the standard gas testing apparatus in the modified structure;

FIGURE 26 is a vertical sectional view taken through a further modification of the sensing cell;

FIGURE 27 is a top view of the cell mounted as shown in FIGURE 26;

FIGURE 28 is a sectional view through the cell as seen along line 28—28 in FIGURE 26;

FIGURE 29 is a sectional view taken along line 29—29 in FIGURE 26;

General apparatus

Figure 6:
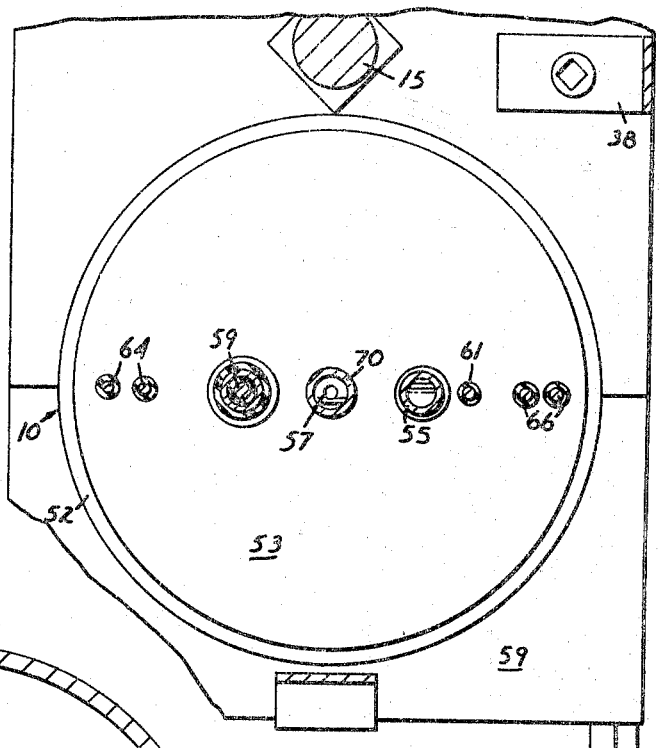
FIGURE 6 is an enlarged sectional view taken along line 6—6 in FIGURE 5.
Figure 7:
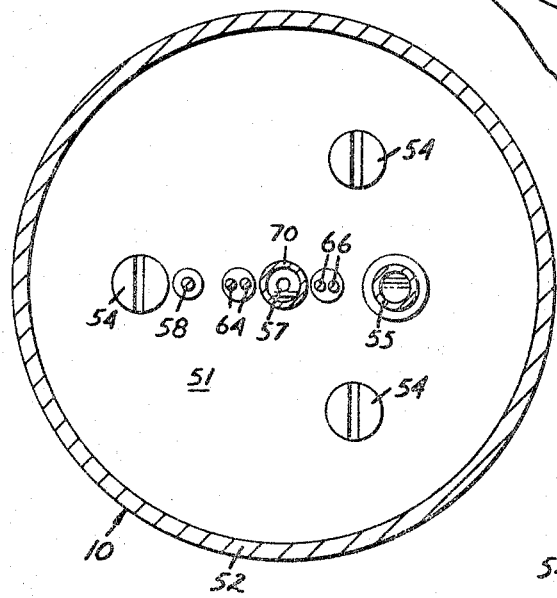
FIGURE 7 is an enlarged sectional view taken along line 7—7 in FIGURE 5.
Figure 8:
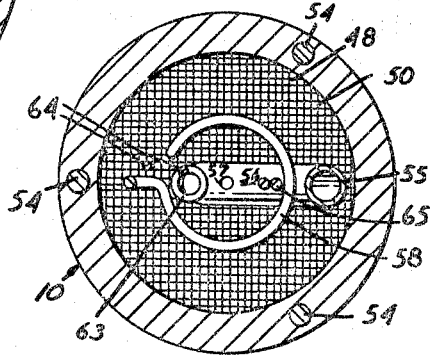
FIGURE 8 is an enlarged sectional view taken along line 8—8 in FIGURE 5.

The general mechanical arrangement by which samples of atmosphere are removed from individual jars or bottles is best seen with reference to FIGURES 1 through 3. In these figures, a sensing cell 10 is illustrated with a downwardly extended inlet tube 11 through which atmosphere is drawn from the interior of a typical bottle 9 shown on a conveyor 8. The shape of the bottle 9 is immaterial to the practice of the invention, although the apparatus is particularly designed for bottles or jars having restricted inlet openings that confine the interior of the bottle. The type of conveyor 8 is not particularly important so long as it is a conveyor of the continuous moving type, frictionally engaging the bottles 9, but allowing the bottles 9 to be stopped without retarding the action of the conveyor.

The device is shown mounted on a rigid supporting framework 12, which has fastened to it a cabinet 13 including an upright wall on which the various components shown in FIGURE 1 are mounted. The cabinet 13 may house the various electronic components utilized in connection with the sensing cell 10, as will be described in detail below. Mounted on the upright wall of the cabinet 13 is a positioning cylinder 14 having a shiftable piston rod 15 at the end of which is fixed the cell 10. The rod 15 is shown mounted for movement along a vertical axis. This particular attitude is most feasible for use in conventional facilities where the bottles 9 are normally traveling along a horizontal conveyor 8.

Directly above the conveyor 8 is a movable stop 16 mounted on a base 17 for pivotal motion about an axis 19. The stop 16 is adapted to be movable between the extended position shown in FIGURE 2 and the retracted position shown in FIGURE 3. As seen in FIGURE 2, the front surface of the stop 16 when extended, prevents additional movement of the abutting bottle 9. When shifted to the position shown in FIGURE 3, the stop 16 clears the bottle 9 and allows it to pass due to the movement of the conveyor 8. The purpose of the stop 16 is to temporarily prevent movement of the bottle 9 during insertion of the tube 11 to enable the device to obtain a sample of atmosphere from within the bottle 9.

In FIGURES 1 and 2 the bottle 9 is shown in its position for testing.

The basic apparatus shown in FIGURES 1 through 3 is adapted to stop each individual bottle 9, insert into the bottle the tube 11, draw a sample of atmosphere from the bottle 9, remove the tube 11, and then allow the bottle 9 to proceed with the conveyor 8. This is accomplished by means of a pneumatically controlled arrangement generally shown in the drawings, utilizing conventional valves and cylinder components which will not be described in structural detail.

Mounted on the movable stop 16 is a protruding actuating arm 18 pivoted about a pin designated by the numeral 18a. The movable stop 16 is controlled by means of a cylinder 20 mounted on base 17 and provided with a reciprocable piston rod 22. The outer end of rod 22 is threaded as shown in FIGURES 2 and 3 and receives a nut 23 adapted to abut a bracket 24 extending from the side of the stop 16. The opposite side of the bracket 24 is abutted by a spring 25 that encircles the outer end of rod 22 and abuts the rod 22 at its extremity. Expansion of the cylinder 20 will cause the rod 22 to move to the left as shown in FIGURE 3, pivoting the stop 16 about the pivotal axis 19 to positively cause the stop 16 to clear the moving bottle 9. When the cylinder 20 is retracted, the rod 22 will move freely relative to bracket 24, the bracket 24 being biased to its original position (FIGURE 2) by the spring 25. However, should a bottle 9 be in the path of movement of the stop 16, the lost motion connection provided by the spring 25 will allow the stop 16 to remain clear of bottle 9 until it has passed, at which time the spring 25 will return the stop 16 to the position shown in FIGURE 2.

The pneumatic system that operates the various devices in the sequence previously described can be best understood from a study of FIGURES 1 through 3. A supply line 28 is utilized to carry air under the required operating pressure to the various components that operate cylinders 14 and 20. The supply line 28 is provided with a pressure regulator 30 and filters 31. The line 28 leads to a pair of control valves 26 and 27 which respectively operate the double acting cylinders 14 and 20.

In order to detect the presence of a bottle against the extended stop 16, the actuating arm 18 operates a valve 32 mounted on the arm 16. The valve 32 is connected by means of tubing 33 to the bottom inlet of the control valve 26. When pressure is exerted on the valve 32 by means of the arm 18, the control valve 26 will shift so as to cause pressure from supply line 28 to be directed to the top end of cylinder 14. This will cause the piston rod 15 to move downwardly relative to the cabinet 13, thereby inserting the tube 11 within the bottle 9.

Downward movement of the rod 15 will continue until a lower valve 35 on the cabinet 13 is actuated. The valve 35 is adapted to be contacted by means of an adjustable screw 40 mounted on a side bracket 38 fixed to the cell 10. The dashed line position illustrated in FIGURE 1 shows the contact of the valve 35 by the screw 40. The valve 35 is connected by means of tubing 35 to the top inlet of control valve 26, and is adapted to reverse the position of the valve 26 so as to cause operating pressure to be directed to the bottom of the double acting cylinder 14. This will reverse the position of the sensing cell 10 and cause it to be raised once more to the position shown in full line in FIGURE 1.

Also mounted on the cabinet 13 is an upper control valve 41 adapted to be abutted by an upwardly directed screw 44 on bracket 38. The valve 41 is connected to the top inlet of control valve 27 by means of tubing 42. When valve 41 has been contacted by screw 44, it will cause the control valve 27 to expand the cylinder 20 due to its connection by supply tube 43, which will be provided with high pressure air. This expansion of cylinder 20 in turn pivots the stop 16 to the position shown in FIGURE 3, thereby allowing the bottle 9 to pass the stop 16.

When the stop 16 has been fully pivoted, it will contact a fourth control valve 45 mounted on the base 17 and connected by means of tubing 46 to the bottom of the control valve 27. This contact of valve 45 will reverse the orientation of control valve 27, directing high pressure air through a supply tube 47 to the opposite end of cylinder 20 to cause the piston rod 22 thereof to be retracted permitting the stop 16 to return to its original abutting position shown in FIGURE 2 in the manner previously described.

The pneumatic system utilized to perform to the operational sequence previously described uses conventional valve devices in the particular combination to stop individual bottles for testing purposes and to allow them to again move after the test has been completed. It is believed that the structure utilized will be evident from the foregoing description and from the detailed drawings shown in FIGURES 1 through 3. The operation of the device is believed to be evident from the description and drawings.

*Sensing cell*

The details of the sensing cell 10 can best be seen in FIGURES 5 through 8. The cell comprises a lower hollow cylindrical chamber 48 made of brass. The chamber 48 has a restriced lower inlet 49 in open communication with the downwardly extending hollow inlet tube 11. The inlet 49 of the chamber 48 is provided with a diffusing screen 50. The lower chamber 48 is covered by a cover plate 51 held in place by three screws 54. The plate 51 is of a greater diameter than the chamber 48, and is enclosed along its upper portion by a cylindrical cover 52 secured thereto, and sealed to a top mounting plate 53 engaged by a collar 59 to which in turn is fixed the lower end of the piston rod 15 and the bracket 38 previously described (FIGURE 6).

Extending through the plates 51 and 53 and into the interior of the lower chamber 48 is a hydrogen tube 55 terminating at a flame nozzle designated by the numeral 56. The nozzle 56 is provided with an upwardly directed small orifice 57 through which hydrogen gas escapes into the interior of the chamber 48.

Spaced from the flame nozzle 56 and located coaxially above the orifice 57 is a horizontal collector ring 58 made of electrically conductive material having a shield grounded to plate 53 by a short connecting wire 60. The tube 55 is also made of electrically conductive material. Ring 58 and tube 55 are respectively connected by leads 59, 61 to an electrometer, which will be described below.

The purpose of the orifice 57 is to provide a small stream of hydrogen for burning purposes. In order to ignite this hydrogen, an igniter coil 63 is provided directly adjacent to the orifice 57. The resistance coil 63 is provided with leads 64 that extend to the electrometer 62, which, in preferred form, includes a suitable source of low voltage power for heating the coil 63.

In order to provide remote monitoring of the flame at orifice 57, a thermocouple 65 is provided adjacent to the orifice 57. The leads 66 from the thermocouple 65 are wired to a millivoltmeter which shows the voltage produced in the thermocouple 65 due to the flame at the orifice 57.

Coaxially with the inlet 49 of chamber 48 is an upper outlet 68 connected by means of tubing 70 to a vacuum pump unit as shown in FIGURE 4 as a combination hydrogen generator and pump unit 71.

A suitable source of alternating current power 72 is wired to the electrometer 62 and to the pump and generator unit 71. It is also wired to a direct current unit 73 to provide the necessary direct current for the operation of the relays controlled by electrometer 62. A main control switch 74 is interpposed between the electrometer 62 and a low voltage relay 75. The electrometer 62 is utilized to control the relay 75, which in turn operates a more powerful relay 76, to control a rejector mechanism 78 connected to leads 77. The particular rejector mechanism is preferably a device for puncturing plastic bottles found to be contaminated so that the bottles would automatically not be filled by conventional vacuum filling methods.

The basis of the detection system is the hydrogen flame detector similar to those in use with commercial gas chromatographs. The particular detector shown in the drawings was designed to be better adapted to the testing of bottles. It is designed to draw air from within a bottle, up through the cell 10 and to sense the presence of organic vapors.

The internal volume of the chamber 48 is preferably as small as practical in order to reduce the time required for a pulse of sample atmosphere to be taken in from a bottle and then flushed out prior to the reception of the next pulse. The tube 55 is the negative electrode of the apparatus and the collector ring 58 is the positive electrode. Both are insulated from the grounded body of the chamber 48 and from the plates 51 and 53. The igniter wire leads 64 and the thermocouple 65 are also held in place within the chamber 48 by means of suitable insulating materials such as epoxy cement. Teflon has been used for the electrode insulation instead of the epoxy cement because of the high impedance necessary (about $1 \times 10^{10}$ ohms). All electrodes and wires are securely attached to the mounting plate 53 and all of the various wires are shown in FIGURE 1 enclosed within a covering cable 78.

The flame jet tube 55 is connected to the pump and hydrogen generator unit 71. The hydrogen is burned in a tiny flame at the orifice 57 in a stream of atmosphere drawn up through the lower tube 11. A small pump contained in the unit 71 is attached to the tubing 70 to pull the sample and combustion products through the detector cell 10. As the atmosphere being drawn into the chamber 48 mixes with the hydrogen and burns, vapors of organic contaminants are also consumed in the flame. The carbon atoms of organic substances give rise to ions which are attracted by the positive electrode (ring 58). This gives rise to a small electrical current which is measured by the amplifier within electrometer 62 connected by leads 61, 59 in a circuit containing the igniter (negative electrode) and the collecting ring 58 (positive electrode). The measured current is proportional to the concentration of organic substances over a million fold concentration range. By the instrument, as little as $10^{-9}$ grams of substance can be detected and the detector can operate to detect limits of 10 parts per million of cyclohexane or 68 parts per million of methane in the sample.

The igniter coil 63 is preferably made of resistance wire such as Nichrome which is connected to a low voltage power source (3 to 4 volts) contained in the electrometer 62. When turned on, the coil heats to a red heat which ignites the hydrogen flame at the orifice 57. The flame normally stays lit and the igniter coil 63 is used only at start-up. Coil 63 serves also as the negative electrode. The thermocouple 65 is preferably an iron-constantan thermocouple positioned near the flame at orifice 57. Its attachment to the millivoltmeter 67 as previously described indicates to the operator of the apparatus whether or not the flame is lit.

The pump and hydrogen unit 71 is a conventional device designated as Model A-650 by Wilkens Instrument and Research, Inc. It operates from a conventional 110 volt A.C. circuit and produces hydrogen by electrolysis of water at the rate of 15–40 ml. per minute. It includes a small pump which is used to draw air and sample through the detector cell 10 at the rate of about 300 ml. per minute.

The electrometer amplifier 62 is also a commercial unit, Model A-600-C manufactured by Wilkens Instrument and Research, Inc. The electrometer provides the polarizing potential for the electrodes in the detector cell 10 and amplifies the signal produced in the cell to about 1 millivolt at 100–1000 microamps. The power supply for the igniter coil 63 is contained within the Model A-600-C electrometer.

*Modified testing apparatus*

In FIGURES 9 through 17 is illustrated a modified form of testing apparatus, including improved control devices which insure automatic operation of the basic elements described above and interlock such operation with the operation of the associated conveyor and indexing elements that control bottle movement and associated machinery used in conjunction with the testing apparatus.

FIGURES 18 through 22 illustrate a modified stop and indexing mechanism and FIGURES 23 and 24 illustrate schematically the wiring circuitry associated with these improved forms of the basic apparatus.

Referring now to FIGURES 9, 10 and 11, the modified construction of the testing apparatus is housed in a cabinet 80. Cabinet 80 has a rectangular configuration and, in use, is sealed at its front and two sides by hinged doors (not shown), the front and left hand door having glass panels to permit visual inspection of the apparatus. These doors are not shown in the drawings, since they would obstruct the view of certain elements. It is important that cabinet 80 be fully enclosed in order to maintain proper and constant interior working temperatures, as will be explained below. Furthermore, the sealed cabinet can be safely washed down along with other equipment when required by sanitary regulations.

Mounted along the front wall 80A of cabinet 80 is the probe or tube 81 which is inserted within each container being tested on a conveyor (not shown) immediately below cabinet 80. The atmosphere samples are drawn through probe 81 for testing purposes. Probe 81 is reciprocated in a vertical direction by a double acting probe cylinder 82 on cabinet wall 80A. The lower end of the piston rod in cylinder 82 is mechanically connected to a horizontal mounting plate 83 carrying the upper end of probe 81. A suitable vertical guide rod 84 extends upwardly from the plate 83 and is guided within a bushing 85 on the lower mounting bracket for cylinder 82. The rod 84 limits reciprocable motion of probe 81 to the desired vertical direction.

In this form of the apparatus, the detection cell does not move, the only vertical movement being that of probe 81. Probe 81 is connected to the detection cell unit 101 (FIGURE 10) by a flexible length of tubing 105. The movement of probe 81 is monitored by upper and lower proximity switches 87, 88 mounted on wall 80A. The switches 87, 88 are selectively activated by a magnet 86 projecting outwardly to the side of mounting plate 83 (FIG. 9).

At the lower wall of cabinet 80 is a downwardly open hood 90 within which the open lower end of probe 81 is located when probe 81 is in its upper position as shown in full lines in FIGURE 9. FIGURE 9 also illustrates, in dashed lines, the lowered position of probe 81. The hood 90 is used to provide a normal control atmosphere to the open outer end of probe 81 when probe 81 is not in a container for testing purposes. The nature and use of this control atmosphere is fully explained in my co-pending application, Serial No. 544,778 filed April 25, 1966 for Control Atmosphere for Atmosphere Sampling Apparatus.

The probe cylinder 82 is controlled by a pneumatic control panel generally shown at 91 in FIGURE 9. The physical details of the valves, solenoids and other elements included in control panel 91 are not illustrated, since these elements are all conventional. The general requirements of these elements is described further below with relation to the control circuitry.

Mounted on the left wall 80B of cabinet 80 are the control panels for the hydrogen generator and electrometer (FIGURE 11). The hydrogen generator control panel is designated generally by numeral 92. It includes a flow meter 93 and associated switches and lamps conventionally provided with the Wilkens hydrogen generator previously described. A hydrogen gas pressure gauge 94 mounted on wall 80B is used to monitor the pressure of the hydrogen gas being fed to the detection cell unit 101. A visual counter 95 is mounted beneath the gauge 94, counter 95 being used to provide a visual indication of the number of cycles completed by the testing apparatus. An adjustable flow meter 96 and integral needle valve is also provided to regulate the flow rate of the test samples of atmosphere drawn into the detection cell.

Also mounted on the wall 80B is the electrometer control panel 97, which is modified by the addition of two millivoltmeters and by the addition of pilot lights and switches described below. The first millivoltmeter 204 is used to provide a visual indication of the voltage balance in the electrometer circuit. The second millivoltmeter 100 is used in conjunction with a thermocouple to monitor the flame within the detection cell.

From the right of the cabinet there is seen the detection cell unit 101, shown in greater detail in FIGURES 12 through 17. The hydrogen generator 103 and electrometer housing 102 are also visible (FIGURE 10). A combined motor and vacuum pump unit 104 provides the vacuum pressure required by the sampling apparatus. Positive air pressure is supplied separately by a second motor and pump unit 104a.

*Detection cell unit*

The modified form of detection cell unit, mounted in a stationary position within cabinet 80, is best seen in FIGURES 12 through 17. The unit is carried on a panel 106 which can be readily removed from cabinet 80 for repair or replacement purposes. In addition, the detection cell itself is easily dismounted and disassembled to permit access to its interior elements.

Mounted to the right of the detection cell, generally designated as 140, is a solid block 108 of aluminum or other suitable heat conductive material. Block 108 is provided with an upwardly open aperture which receives an elongated molecular sieve. The molecular sieve 107 is connected by tubing 110 at its upper end to the output connection of the hydrogen gas generator 102. The lower end of molecular sieve 107 is sealed by an O-ring 109 in block 108. Its outlet is in open communication with a vertical duct 111 formed in the lower section of the block 108.

Adjacent to the block 108 is a base mounting block 112 for the detection cell 140. The base mounting block 112 is also rectangular in shape, having an abutting surface complementary to the adjacent surface of block 108. It also is preferably made of a heat conducting material to insure even heat distribution throughout is structure. Mounted on block 108 immediately above the detection cell 140 is a clamp support 113 having downwardly extending locking screws 115 that cooperate with the base mounting block 112 to hold the cell 140 in place.

Formed in the lower portion of the mounting block 108 is a horizontal duct 116 which intersects the vertical duct 111. The duct 116 continues through a portion of the base mounting block 112 and terminates in an upwardly directed delivery duct 117, which extends through the upper portion of the base mounting block 112.

A horizontal needle valve 118 is provided in the horizontal duct 116 to permit accurate control of the gas delivered through molecular sieve 107 and the ducts 111, 116 and 117. The needle valve 118 is threadably supported in a mounting sleeve 120 carried on block 108.

The detection cell 140 includes three basic elements, a base section, a cylindrical casing section, and an upper cover. The base section includes a solid cylindrical metal base 121. Fixed to base 121 is a burner support 123 carrying a quartz burner tip 124. The base 121 fits within a complementary recessed seat 122 formed in the upper portion of block 112.

Mounted within the cylindrical casing 127 of detection cell 140 is an intermediate annular ring 126. This ring bears downwardly against the upper surface of a tubular sleeve 125 surrounding the quartz tip 124. The sleeve 125 is provided with an inlet duct 130 through which atmosphere samples are delivered to an opening 131 in the sleeve 125 immediately adjacent to the upper end of the burner tip 124. In this manner, each atmosphere sample is delivered to the flame provided at the upper end of the hollow burner tip 124. An inlet tube 132 projects outwardly from base 121 and is connected to probe 81 through the flexible length of tubing 105.

The three general elements of the detection cell 140 are sealed by compression of a first O-ring 128 carried between the burner tip supports 123 and the lower surface of the sleeve 125 and by a second O-ring 134 mounted between the inner surface of casing 127 and a cover 133. The cover 133 includes a vertical length of tubing 142 which in turn is connected by tubing 143 to the vacuum side of the pump motor unit 104. The vacuum pressure through tubing 143 and cell 140 is used to draw the atmosphere sample from the probe 81 for testing purposes. It also draws the control atmosphere from hood 90 to evacuate cell 140 after each testing cycle.

Located within the cell 140 are the general components described with regard to the first embodiment of this apparatus. These include a cylindrical collector 135 for detecting the presence of ionized contaminant molecules, a thermocouple 136 for monitoring the presence of a hydrogen flame within cell 140 and an igniting coil 137 used to initiate burning of the hydrogen flame. These elements are each connected, by releasable electric connectors on the exterior of casing 127, to the electronic circuits used in conjunction with the apparatus.

One serious difficulty encountered with the use of a hydrogen gas detection cell in the continuous monitoring of atmosphere samples is the tendency of water in both the atmosphere sample and the hydrogen gas to condense in the communicating tube and duct areas. To combat this, I have found it effective to embed heaters 138 in the block 108, 112 and to place heaters 138 also along the length of tubing leading from the sampling probe 81 and the hydrogen generator 102. The heaters 138, of conventional design, are shown in FIGURES 14 through 17. They basically are located adjacent to the more critical portions of the communicating ducts and tubing so as to insure continuous and relatively constant heating of these areas. A thermostatic control 141 is mounted on block 108 to monitor its exterior temperature, the control 141 being wired to the several heaters 138. I have found it advisable to maintain a constant temperature of 120 to 140 degrees F. in the area of the detection cell 140 in order to eliminate water condensation within the apparatus. When overheating occurs due to outside temperatures, a thermostatic control fan (not shown) is used to maintain the cabinet interior temperature constant.

*Stop apparatus*

In FIGURES 18 through 22 is illustrated in detail a modified form of the stop apparatus which controls the passage of containers beneath cabinet 80 to selectively interrupt the normally continuous movement of each container during insertion of probe 81. This structure basically comprises a horizontal base 144 adapted to be secured to the conveyor framework. Mounted on base 144 is a movable stop 145 pivotally carried by an upright pin 151. The outwardly directed extension of stop 145 is provided with a small protruding roller 149 to facilitate movement of containers in contact with stop 145 after stop 145 has been momentarily retracted at the completion of a testing cycle.

An actuating arm 147 is pivotally carried about a pivot bolt 146 located on stop 145 opposite to pivot 151. Arm 147 is freely movable about the vertical pivot axis of bolt 146 to the position shown in FIGURE 30. Such movement is accomplished upon original contact of arm 147 by an incoming container on the constantly moving conveyor beneath base 144. A weak permanent magnet 150 carried in a fixed position on the movable stop 145 biases the arm 147 to its rearward position (FIGURE 18), magnet 150 being operatively aligned with a lever 148 fixed to and extending forwardly from the arm 147. In the position shown in FIGURE 18, the outer tapered end of arm 147 protrudes rearwardly a slight distance beyond the rounded tip of the stop 145.

The outer end of lever 148 carries a magnet 155 which swings beneath a fixed shelf 152 on base 144. A proximity switch 162 on the shelf 152 is selectively actuated by passage of magnet 155 beneath it when the arm 147 is pushed forwardly by an incoming container.

At the rear of the movable stop 145 is an extension 157 which cooperates with a magnet 156 on the base 144 to normally hold the movable stop 145 in an outwardly protruding position illustrated in FIGURE 18. A tension spring 154 connected between stop 145 and base 144 also biases stop 145 to this position. Spring 154 serves to return stop 145 to the position shown in FIGURE 18 after it has been shifted inwardly in the manner illustrated in FIGURE 31.

The stop 145 is selectively shifted inwardly by a cylinder 158 carried upon a bracket 160 on base 144. The outer end of the piston rod for cylinder 158 is fitted with a pusher pad 161 which selectively strikes stop 145 to pivot it about pivot 151 in a clockwise direction as seen in FIGURE 18.

Also carried on base 144 is a puncturing cylinder 163, which is merely a double acting pneumatic cylinder having a piston rod 164 provided with a puncturing tool 165 at its outer end. The cylinder 163 is carried on a bracket 166 slightly rearward of the protruding point of stop 145 and arm 147 so that the locus of tool 165 intersects the position of a container resting against the stop 145. The details of the tool 165 and its operation in puncturing containers is fully described in my copending application Serial No. 555,373 filed June 6, 1966 for Bottle Puncturing Method and Device.

Figure 30:
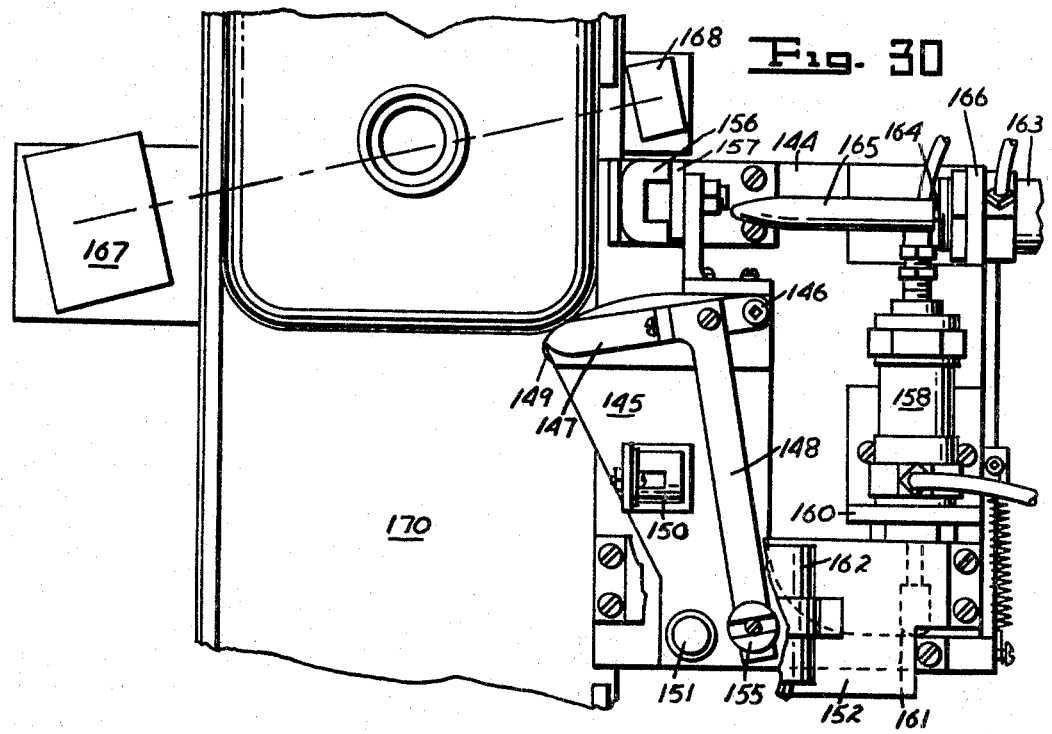
FIGURE 30 is a first operational view of the modified stop apparatus showing initial contact by a container.
Figure 31:
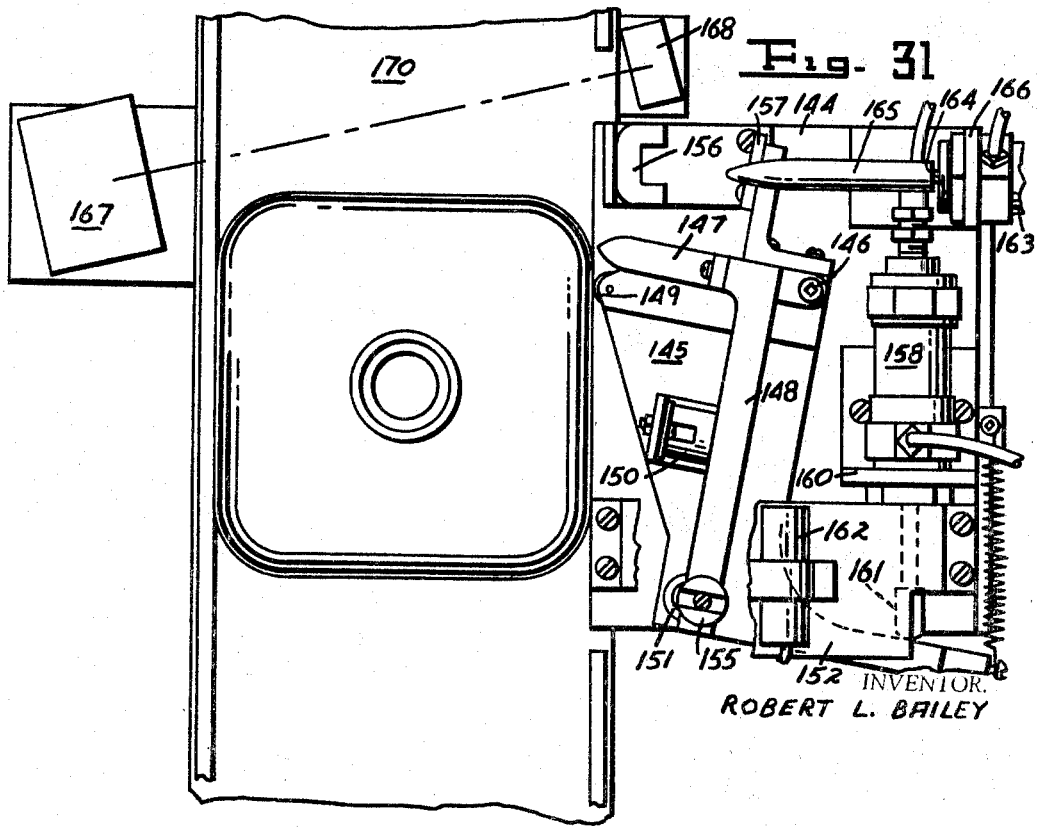
FIGURE 31 is a view similar to FIGURE 30, showing release of the container following the testing procedures.

In order to complete the apparatus associated with the stopping of containers, a photoelectric cell 167 is mounted in the vicinity of base 144. As illustrated in FIGURES 30 and 31, the photoelectric cell 167 is directed at a slight rearward angle across the conveyor on which the bottles or containers travel. A light source 168 aligned with the cell 167 provides a light path which will intersect the incoming corner of a container slightly prior to passage of the front wall of the container by the movable stop 145. The purpose of the photoelectric cell 167 is to provide automatic operation of the testing equipment when a translucent or opaque container passes through the light path, so that the apparatus on base 144 need not be moved or disassembled when the container conveyor 170 is being used to convey types of containers that need not be tested. This will be described more fully below.

*Control circuitry*

The basic controls for the electrometer, detection cell and the monitoring meters which provide a visual indication of the operational characteristics of the contaminant detection apparatus are shown in FIGURE 23. The schematic wiring diagram for these circuits is illustrated with the control relays and their contacts in functionally related positions. The contacts of each relay are located in the diagram adjacent to the devices controlled by them, rather than being grouped adjacent to the symbol designating the relay coil. The contacts for each relay are identified by the numeral which designates the relay coil structure, plus a letter designating the particular set of contacts.

The circuitry which actuates the apparatus is shown toward the bottom of FIGURE 23. The circuits are powered from a source of conventional line current at terminals 171, 172. Line current is supplied to the apparatus through lines 173 and 174 connected respectively to terminals 171 and 172.

The detection unit is initially activated by either of two manual switches 176, 177 or by the previously described photoelectric cell 167. It is placed in operational readiness by activation of the coil of relay 175, one side of which is connected to line 174. The remaining side of the coil for relay 175 is selectively wired to line 173 through one of the three-way switches 176, 177 or through photoelectric cell 167, which is wired in parallel with each of the switches 176 or 177. Activation of switch 176 or 177, or actuation of photoelectric cell 167 also completes circuits to pilot light 178. It is to be noted that the switch 176, which is on the left wall 80B of cabinet 89 along with the pilot light 178 (FIGURE 11) have identical counterparts in the circuitry shown in the lower right hand corner of FIGURE 23, which preferably is located at a remote station generally designated by the numeral 180. The remote station 180, which includes switch 177 and light 178a can be conveniently located at any position along the container line utilizing the testing apparatus. The remote station 180 will usually be positioned adjacent to associated machinery for observance by the operator thereof. The same duplication of equipment at remote station 180 is also true of pilot lights 181a and 182a which will be further discussed below.

FIGURES 23 and 24 must be considered together to understand the circuitry associated with normal testing operations of the apparatus. The normally open proximity switch 162, which has previously been described with relation to the stop apparatus, is inserted in series with the coil of a relay 183 between lines 173 and 174 (FIGURE 24). The line 173 in FIGURE 24 includes normally open relay contacts 175a controlled by relay 175. The circuit between line 173 and the coil of relay 183 also includes two normally closed sets of relay contacts 201a and 217a described below. When either of the switches 176 or 177, or the alternative photoelectric cell 167 is actuated, relay 175 will be activated to close relay contacts 175a. Subsequent contact of the actuating arm 147 (FIGURE 30) by a container will close the normally open proximity switch 162 on shelf 152, thereby completing a circuit to relay 183. Relay 183 is therefore actuated when a container is properly indexed beneath the cabinet 80 for testing purposes.

Relay 183 closes a first set of normally open contacts 183a wired in series between line 173 and 174 with the valve control solenoid 184 (FIGURE 24) that controls the operation of the probe cylinder 82. Another set of normally closed contacts 185a, described below, is also in series with contacts 183a. Closing of contacts 183a actuates solenoid 184 in such a manner as to shift the pneumatic valve controlled thereby to apply pressure to the upper end of cylinder 82 and cause downward movement of probe 80.

Downward movement of probe 80 will continue until the magnet 86 which moves with it actuates the lower proximity switch 88 (FIG. 9), completing a circuit between lines 173 and 174 to the coil of a relay 185 (FIG. 24). Normally closed relay contacts 185a then open the circuit to solenoid 184, reversing the operation of the valve controlled thereby and raising probe 81. In addition, normally open contacts 185b are closed in series with previously closed contacts 183b to complete an alternate holding circuit for relay 185 parallel to the circuit through the normally open lower proximity switch 88. The upward movement of probe 81 continues until the magnet 86 actuates the normally open upper proximity switch 87 wired in series with a normally closed pair of relay contacts 193b and normally open contacts 185c together with a relay 186 across the lines 173 and 174. Since contacts 185c are closed by initial operation of relay 185 and are held closed by the holding circuit for relay 185, closing of switch 87 will actuate the coil of relay 186. A normally open pair of contacts 186a controlled by relay 186 is used to complete a circuit to the previously described counter 95, to register completion of a testing cycle. A pair of normally closed contacts 186b are opened simultaneously upon actuation of relay 186, causing indexing cylinder solenoid 187 to shift the pneumatic valve and the controls cylinder 158 so that the movable stop 145 is shifted to the position shown in FIGURE 31, permitting passage of the tested container.

When the movable stop 145 is pivoted about its support pin 151, arm 147 is immediately returned to its original position with lever 148 held by magnet 150, since lever 148 will strike a depending tab 152a that protrudes downwardly from shelf 152 (FIGURE 19). The movement of arm 147 relative to the stop 145 will shift magnet 155 from its previous position beneath the proximity switch 162, thereby opening switch 162. Opening of switch 162 opens the holding circuit to the coil of relay 185 through the contacts 183b and 185b and also opens the circuit to relay 183. This completes normal testing and the apparatus is now ready for the next testing cycle.

As described with relation to the first embodiment of this device, a vacuum is constantly applied through the lower end of probe 81 to constantly draw atmosphere through probe 81 to the detection cell 140 for testing purposes. The collector circuit wired to collector 135 is operatively connected to the commercially available electrometer circuitry identified in relation to the first embodiment of the device and designated generally in FIGURE 23 by the numeral 188. Electrometer 188 is provided with a pair of terminals wired to lines 190, 191. Variations in the balance of electrometer 188 due to ionization currents within cell 140 will be reflected at voltage variations in lines 190, 191.

Connected to the lines 190, 191 is a metering relay 192 including a set of normally open contacts 192a. The relay 192, being a low voltage relay, is used to control the coil of a direct current relay 193. Direct current for relay 193 is obtained through a transformer 194 wired across the lines 173, 174 and a rectifier circuit 195 having direct current output lines 196, 197. Relay 193 is wired across lines 196, 197 in series with normally open relay contacts 175c, which are closed upon activation of the coil of relay 175 (by switches 176, 177 or photoelectric cell 167). Relay 193 is also wired in series with normally closed contacts 198a discussed below.

A variation in voltage across the electrometer terminal lines 190, 191 will actuate a locking metering relay 193, designated in FIGURE 23 as "Contaminant Detected Relay." Relay 193 in turn closes normally open contacts 193a (FIGURE 24) completing a circuit to solenoid 198 which controls the pneumatic valve that operates the puncturing cylinder 163. Another set of contacts 193b (normally closed), are opened by actuation of relay 193, to open the circuit between line 173 and relay 186.

No interruption in the normal operation of probe cylinder 82 is effected by detection of a contaminated container. The probe 81 will continue downwardly, closing the lower proximity switch 88. This in turn will activate relay 185 and the holding circuit including contacts 185b. The opening of relay contacts 185a will result in the lifting of probe 81 by probe cylinder 82. However, actuation of the counter relay 186 will be delayed following the closing of contacts 185c, due to the series connection with the temporarily-open contacts 193b. Actuation of relay 193 by detection of a contaminated bottle also completes a circuit across lines 173, 174 to a time delay coil of relay 198 (FIGURE 23) wired in series with normally open relay contacts 193c. Relay 198 has a five second delay, and controls normally closed relay contacts 198a wired in series with the coil of relay 193. Therefore, five seconds after relay 193 is actuated by detection of a contaminant, the circuit to relay 193 will be opened by opening of contact 198a if it has not previously been opened by release of contacts 192a of the meter relay 192. Normally this five second period is sufficient to exhaust the contaminant vapors through the detection cell 140, since probe 81 will in the meantime have been raised to the area of hood 90 and thereby supplied with fresh environmental air. In actual operation, the normal complete cycle of movement of probe 81 need not be longer than 1 second.

There are two conditions which can occur during operation of the device which would make proper operation impossible. Suitable safeguards are built into the controls to insure that the testing cycle is interrupted if either occurs. The first is the possibility that the flame at the burner tip 124 in cell 140 might be extinguished. The second is the possibility that the circuitry within electrometer 188 might be unbalanced due to changes in temperature or simply aging of the electrometer circuit components which would reduce the sensitvity of the device below acceptable levels.

The thermocouple 136 which monitors the hydrogen flame in cell 140, is wired to a locking coil relay 200 having normally open contacts 200a wired in series with the coil of a relay 201 across the direct current terminal lines 196, 197. If the current from thermocouple 136 is reduced to reduction of the flame or the fact that the flame has been extinguished, the relay 200 will be activated, causing contact 200a to close and thereby actuating the coil of relay 201, which will remain activated due to the fact that contact 200a will remain closed.

Relay 201 is provided with a first set of normally closed contacts 201a (FIG. 24) in series with the coil of relay 183. Opening of contacts 201a by activation of relay 201 immediately stops operation of the pneumatic circuitry shown in FIGURE 24. Probe 81 is lifted, since contacts 183a will open. Relay 186 will not be activated, since contacts 185c will also be opened.

Resumption of operation must be manually initiated by relighting the flame, using the igniting coil 137 within cell 140, the coil 137 being controlled by a manual restarting button. After the flame is again established as evidenced by the meter 100 on the wall 80B of cabinet 80 (FIG. 11), the circuit to holding relay 201 can be manually broken by pushing a normally closed push button switch 202 in series with contacts 200a and relay 201. Since the switch 202 resets relay 200, the pneumatic operations can then be reinitiated, beginning with closure of contacts 201a and activation of the relay 183 as previously described.

When the flame is extinguished, the pilot light 181 on each control panel is lighted by completion of a circuit across lines 173, 174 due to closing of relay contacts 201b. Pilot light 181 provides a visual indication to the operator of the apparatus that the flame requires relighting for proper operation.

The circuitry within electrometer 188 is subject to becoming unbalanced after periods of continuous use, particularly due to aging of the circuit components and changes in the operating temperatures of the device. The electrometer circuitry 188 includes a variable potentiometer 203 which is capable of adjusting the balance of the electrometer. The balance of the electrometer circuit 188 is visually monitored by the visual meter 204, connected to output terminals 190, 191 along with the meter relay 192 previously described. The voltmeter 204 is wired in such a manner that the movable indicator needle 205 will normally register a negative biasing voltage within a desired sensitivity range. The normal voltage registered by needle 205 when environmental air is being provided to probe 81 is initially set by manual adjustment of potentiometer 203. A double-pole, double-throw switch 206 is utilized to alternately connect the balancing terminals 207 of the electrometer circuit 188 to the manually controlled potentiometer 203 or to a motor driven potentiometer 208.

Potentiometer 208 is motor controlled by means of a reversible motor 210. Motor 210 is actuated, under certain operating conditions, whenever needle 205 of meter 204 closes a circuit with a limiting contact 211 or 212. The circuit through contact 212 will be made whenever the negative bias monitored by meter 204 exceeds the preset limit determined by its location relative to the voltmeter scale. Drift of needle 205 beyond the limit set by contact 212 is an indication that the electrometer 188 no longer has the sensitivity required for testing and immediate correction is thus required. The circuit through contact 211 is set physically on the voltmeter 204 in such manner as to be completed by needle 205 when the electrometer sensitivity range is narrowed to the point of approaching the normal contaminant level of the environment in which the apparatus is operating.

Contact of the meter needle 205 with the contacts 211, 212 is signalled through an amplifier 213 which is wired in such a fashion as to complete a circuit to a relay 214 when the terminal 211 is contacted and to a relay 215 when terminal 212 is contacted.

Contact with terminal 211 might mean either that the electrometer circuitry is unbalanced or that a contaminant has been detected within a container. Actuation of relay 214 serves to close two sets of normally open contacts 214a and 214b completing a circuit to control circuit 218 that operates motor 210. The output of motor 210 is mechanically connected to the potentiometer 208. The contacts 214a are wired to the proper side of motor control circuit 218 to turn motor 210 in the direction necessary for corrective purposes. Should relay 214 have been actuated due to the detection of a contaminant within a container, the simultaneous actuation of the contaminant detected relay 193 will have opened the normally closed set of contacts 193d in series with contacts 214a and 214b, temporarily preventing correction by operation of motor 210. This temporary delay will not exceed five seconds, at which time the contacts 193d will again be closed to permit correction if still required. Oviously, if the unit has cleared itself the following detection of a contaminant, the needle 205 will have returned to its normal operating position between contacts 211 and 212, and the relay 214 will have been deactivated prior to closing of contacts 193d.

When the needle 205 on voltmeter 214 drifts to the left beyond contact 212, electrometer 188 no longer is operating in the required sensitivity range for detecting the desired minimum range of contaminants sufficient to be of public health significance (10 parts per million cyclohexane in a sample of air as an example) and operation of the unit must be interrupted. This interruption is effected through activation of the lower limit relay 215, which closes a pair of normally open contacts 215b, completing a circuit to a balance correction relay 217 (FIG. 23). Relay 217 is provided with a pair of normally closed contacts 217a in series with the previously described contacts 201a in the circuit for relay 183 and the holding circuit for relay 185. Opening of contacts 217a terminates operation of the pneumatic elements in the apparatus in the same manner as previously described with regard to contact 201a. The probe 81 is immediately raised and the final counter relay 186 cannot be actuated, requiring complete recycling of probe 81 in order to release the container.

Actuation of relay 215 also closes normally open contacts 215a wired to the proper side of the motor control circuit 218 to cause the desired rotation of motor 210 and correction of potentiometer 208. The contacts 215a are in series with the now-closed contacts 217b operated by relay 217, and will operate motor 210 unless the hydrogen flame has been extinguished, when contacts 201c will be open.

Under some circumstances, it is necessary to shut down associated equipment during the time in which the electrometer 188 is being balanced and returned to its proper sensitivity range or during times in which the hydrogen flame is extinguished. This is accomplished through a ten second time delay relay 216 wired in series with normally open contacts 201d and 217d wired parallel to one another in series with relay 216. Relay 219 has its coil wired on one side to line 174 and on its opposite side through contacts 217d and 201d to line 173. Normally open contacts 219a controlled by relay 219 are wired in a power circuit to an external normally deenergized relay 222 which will effectively stop the operation of an associated bottle washer in a dairy. Obviously, the contacts 219a can be used to terminate the operation of any associated equipment, such as a conveyor, filling machine, etc. The operation of relay 219 is delayed ten seconds following the closing of contacts 201d or 217d in order to prevent unnecessary shut down of the bottle washer or other equipment in case of a momentary malfunction in the testing equipment.

When the desired sensitivity of electrometer 188 is temporarily lost, this condition is visually indicated to the operator of the machine by closing of relay contacts 217c which complete circuits to lamps 182 on the cabinet 80 and at the remote station 180.

Summary of operation

The controls described above provide an interrelated testing apparatus which normally operates automatically. It is also capable of either correcting itself following a malfunction and of halting its cycle of operation along with that of selected associated equipment. The details of operation are described above in connection with the relays and contacts which operate the various solenoids. These operations can be capsuled as follows:

*Normal testing procedure.*—The closing of switch 162 due to proper positioning of a container beneath the testing apparatus will turn on the testing unit if it was not previously activated and will begin downward movement of probe 81, through which atmosphere is constantly drawn by vacuum pressure. Assuming no contaminant is detected, movement of the probe 81 will reverse and stop 145 will be retracted to permit the tested container to pass by it.

*Contaminant detected.*—If a contaminant is detected in the container, the probe cycle will continue uninterrupted, but the puncturing cylinder 163 will be actuated to pierce an aperture in the side of the container and render it unusable. Following this piercing, the stop 145 will be retracted and the container will pass along the conveyor in the usual fashion.

*Flame out.*—If the hydrogen gas flame in cell 140 should decrease or be extinguished, the pneumatic system will be immediately inoperative and probe 81 will be raised unless the full cycle of probe movement has been completed. After ten seconds, the bottle washer or other associated equipment will be shut down. Notice of this condition will be given to the operator by activation of lamps 181 and the condition must be manually corrected before the testing apparatus can function in any manner. After manual correction, the pneumatic system will completely recycle, so that there is never any doubt but that each container is subjected to the full testing procedure. After probe 81 is again lowered and again raised, the stop 145 will permit the container to pass along the conveyor.

*Lack of Sensitivity.*—If the electrometer 188 drifts to a condition wherein it is no longer capable of monitoring the presence of contaminants in the gas being tested within the required sensitivity limits, the pneumatic systems will be shut down immediately in the same manner as when the flame is extinguished. At the same time, the motor 210 will be properly operated to rectify condition by adjustment of potentiometer 203. If correction is not effected within ten seconds, the associated bottle washer or other equipment will be shut down. Visual indication of the condition existing due to lack of sensitivity is shown by the lamps 182. While the automatic controls are normally capable of compensating directly for slight drift, substantial changes due to external conditions might require manual adjustment by proper operation of switch 206 and the manual potentiometer 203. Again, following correction, the pneumatic system which controls probe 81 must be completely recycled so that a container partially tested prior to the malfunction will be subjected to the complete testing cycle before being released by stop 145.

Standard gas system

There is also provided in the testing apparatus an adjustable time delay relay 223 set to hold its contacts to approximate cycle time of probe wired across lines 173, 174 (FIG. 24). The coil of relay 223 is in series with a manually operated push button switch 224, which, when closed, completes the circuit to activate relay 223. Relay 223 has a set of normally open contacts 223a wired in series with a solenoid 225 that operates a valve 226 (FIG. 25). Valve 226 is normally positioned so as to direct air from pump and motor unit 104a and a molecular sieve 227 through line 228 and line 230 to the previously discussed hood 90 within which probe 81 is recessed between testing cycles.

To check the operating efficiency of the apparatus a tank of gas having a standard testing mixture is included in the apparatus, designated as 231. The outlet of tank 231 is connected through a regulator valve 232 and a flow control valve 233 to a line 234 alternately directed to line 230 when solenoid 225 is activated and moved to the position shown in FIGURE 25.

As an example of a standard gas mix, the tank 231 might contain ten parts per million of cyclohexane in air, a standard of sensitivity accepted in the dairy industry for operation of the described testing apparatus. By directing the standard gas mixture to the hood 90 after activating relay 175 as previously described, and therefore supplying the mixture through the probe 81, the detection cell 140, the electrometer 188 and all associated electrical circuits are tested in the same manner as they are used in an actual testing operation to insure rejection of containers with this minimum concentration of contaminants.

Modified detector cell

In FIGURES 26 through 29 is shown a modified form of detector cell, denoted generally by numeral 240. Cell 140 basically comprises the structure previously described, but the proportions involved in the interior volume of the cell are modified as to better insure that the sample being tested mixes thoroughly with the hydrogen gas flame and to permit faster clearing of the interior cell 214 between testing cycles.

The modified cell comprises a base 241, a central cylindrical casing 242 having rather thick cylindrical walls and a thick cover 243, the three elements 241, 242 and 243 being sealed by compressed O-rings 244.

A burner tip 245 is provided within the casing 242, the small vertical duct 246 through the top 245 being at an elevation slightly above the outlet of the tube 130 previously described. Adjacent to the burner tip 245 is an igniter coil 247 leading to an outer terminal 248 by which it can be attached to the controlling circuitry used to heat coil 247 in order to ignite the gas exiting at the burner tip 245. Concentric with the burner tip 245 and directly above it is a collector 250 leading to an exterior terminal 251. By use of a wound wire coil, greater exterior area is provided in the collector 250 without additional linear dimensions. Above collector 250 is the thermocouple 252 leading to an exterior terminal 253. The terminals 248, 251 and 253 are each offset 45 degrees from one another so as to permit access to any terminal. The interior elements carried by the terminals are inserted into casing 242 through the apertures that mount the respective terminals and their size is therefore limited by the size of such apertures.

The detection cell 240 is mounted in the apparatus in the manner previously described, and similar numerals have been used in FIGURES 26 through 29 to designate those elements discussed above.

Conclusion

The testing apparatus described can be in place on the conveyor when not in use so as to be automatically triggered by photoelectric cell 167 when a plastic bottle is in place for testing. Air will be constantly applied to the pneumatic system so as to hold probe 81 up and hold stop 145 retracted. Only after actuation of the unit, manually or automatically, will containers be selectively stopped and will probe 81 be placed in motion.

While various forms of the detection apparatus have been described in detail, obviously other modifications are possible without departing from the intended scope of this disclosure. Therefore only the following claims are intended to limit the scope of the invention.

Having thus described my invention, I claim:

1. An apparatus for inspecting open end containers, such as bottles, jars and the like used for packaging foodstuffs, for the presence of organic contaminants in the containers, the apparatus used with a conveyor for carrying the containers, the apparatus comprising;
   (a) an atmospheric sampler adjacent the conveyor, the sampler including a sampler tube, and tube moving means for moving the sampler tube so that one end enters the open end of each container carried by the conveyor in succession,
   (b) means for removing a sample of atmosphere from each container carried by the conveyor and placing it in the sampler, these means including a source of vacuum in fluid communication with the sampler tube,
   (c) an organic contaminant detecting cell in the line of fluid communication between the source of vacuum and the sampler tube, the detecting cell mounted in a fixed location adjacent the conveyor for detecting and signalling the presence of any organic vapors in any sample removed from an open ended container,
   (d) means adjacent the conveyor for stopping each container adjacent the sampler tube, the stopping means intercontrolled with the tube moving means for moving the sampler tube,
   (e) and a rejection mechanism connected to said cell and positioned adjacent said conveyor for rejecting any containers detected by the cell to have organic contaminant therein.

2. An apparatus for inspecting open end containers such as bottles, jars and the like used for packaging foodstuff, for the presence of organic contaminants in the containers, the apparatus used with a conveyor for carrying the containers past the apparatus, the apparatus comprising;
   (a) an atmospheric sampler adjacent the conveyor,
   (b) means for removing the sample of atmosphere from each container carried by the conveyor and placing it in the sampler,
   (c) an organic contaminant detecting cell in fluid communication with the sampler for detecting and signalling the presence of any organic vapors in the removed sample,
   (d) a rejection mechanism connected to said cell and positioned adjacent said conveyor for rejecting any containers detected by the cell to have organic contaminant therein,
   (d) and container identifying means adjacent the conveyor to render operative the means for removing a sample only when a conveyor to be tested is identified by the container identifying means.

3. An apparatus for inspecting open end containers such as bottles, jars and the like used for packaging foodstuffs, for the presence of organic contaminants in the containers, the apparatus used with a conveyor for conveying the containers past the apparatus, the apparatus comprising;
   (a) an atmospheric sampler adjacent the conveyor,
   (b) means for removing a sample of atmosphere from each container carried by the conveyor and placing it in the sampler,
   (c) an organic contaminant detecting cell in fluid communication with the sampler for detecting and signalling the presence of any organic vapors in the removed sample,
   (d) a rejection mechanism connected to said cell and positioned adjacent said conveyor for rejecting any containers detected by the cell to have organic contaminant therein,
   (e) a source of standard gas containing organic contaminant concentration equal to the minimum concentration detected by the organic contaminant detecting cell,
   (f) and means to selectively direct the gas from said source to said detecting cell.

4. An apparatus for detecting the presence of organic contaminants in open end containers such as bottles, jars and the like used for packaging foodstuffs, the apparatus used with a conveyor for conveying containers in a line with the open end of each container directed identically, the apparatus comprising;
   (a) an open end tube movably mounted adjacent to the conveyor,
   (b) an indexing stop mounted adjacent to said conveyor to selectively stop each container adjacent said tube with the open end of each container aligned with the tube open end,
   (c) power means operatively connected to said tube to selectively move said tube between a first position clear of the container and a second position with the open end of said tube located within a container stopped by said indexing stop.
   (d) organic vapor detection means in fluid communication with said tube,
   (e) means to deliver sample of atmosphere through said tube to said organic vapor detection means,
   (f) container rejection means mounted adjacent said conveyor to prevent use of a container stopped by said indexing stop after detection of an organic vapor contaminant in a sample of atmosphere drawn therefrom,
   (g) and a source of standard gas containing an organic contaminant concentration equal to the minimum concentration to be detected by the detection cell,
   (h) and means to selectively direct the gas from said source to said organic vapor detecting means through said tube.

5. An apparatus for detecting the presence of organic contaminants in open end containers such as bottles, jars and the like used for packaging foodstuffs, the apparatus used with a conveyor for conveying containers in a line with the open line of each container directed identically, the apparatus comprising;
   (a) an open end tube movably mounted adjacent to the conveyor;
   (b) an indexing stop mounted adjacent to said conveyor to selectively stop each container adjacent to said tube with the open end of the container aligned with the tube open end,
   (c) power means operatively connected to said tube to selectively move said tube between a first position clear of a container and a second position with the open end of said tube located within a container stopped by the indexing stop,
   (d) organic vapor detection means in fluid communication with said tube, the organic vapor detection means comprising a hollow sealed flame detection cell including an ionizing flame burner tip and adjacent collector, the tube being in fluid communication with the interior of the cell, a source of combustible gas operatively connected to the burner tip of said cell, and an electrometer wired to the collector of said cell to detect the presence of an ionization current within the cell, (e) means to deliver a sample of atmosphere through said tube to the cell of said organic vapor detection means, (f) and an automatic balancing circuit for said electrometer to maintain the range of sensitivity within the electrometer for detecting the presence of an ionization current within the cell at a preset minimum range.

6. An apparatus as defined in claim 5 further comprising:

control means to interrupt normal operation of said indexing stop and said tube when the automatic balancing circuit of the electrometer is operative and to initiate a new complete cycle of testing a container prior to release of a container by the indexing stop following such operation.

7. An apparatus as defined in claim 5 further comprising:

means operatively connected to the automatic balancing circuit of the electrometer to render inoperative associated equipment relating to handling of the containers along the conveyor during a required balancing operation.

8. An apparatus for detecting the presence of organic contaminants in open end containers, such as bottles, jars and the like used for packaging food stuffs, the apparatus used with a conveyor for carrying containers in a line with the open end of each container directed identically, the apparatus comprising;

(a) an open end tube movably mounted adjacent to the conveyor, (b) in indexing stop mounted adjacent to said conveyor to selectively stop each container adjacent said tube with the open end of the container aligned with the tube open end, (c) power means operatively connected to said tube to selectively move said tube between a first position clear of a container and a second position with the open end of a said tube located within a container stopped by said indexing stop.

(d) organic vapor detection means in fluid communication with said tube, the organic vapor detection means comprising a hollow sealed flame detection cell including an ionizing flame burner tip and adjacent collector, the tube being in fluid communication with the interior of said cell, a source of combustible gas operatively connected to the burner tip of said cell, and an electrometer wired to the collector of said cell to detect the presence of an ionization current with the cell, (e) means to deliver a sample of atmosphere through said tube to the cell of the organic vapor detection means, (f) and control means to interrupt normal operation of said indexing stop and said tube when there is no flame within the cell and to initiate a new complete cycle of testing a container prior to release of the container following the loss of flame.

9. An apparatus as defined in claim 8 further comprising:

means operatively connected to said control means to render inoperative associated equipment relating to handling of the containers along the conveyor during the period in which there is no flame within the cell.

10. An apparatus for detecting the presence of organic contaminants in open end containers, such as bottles, jars and the like used for packaging foodstuffs, the apparatus used with a conveyor for carrying containers in a line with the open end of each container directed identically, the apparatus comprising;

(a) an open end tube movably mounted adjacent to the conveyor, (b) an indexing stop mounted adjacent to said conveyor to selectively stop each container adjacent said tube with the open end of the container aligned with the tube open end, (c) power means operatively connected to said tube to selectively move said tube between a first position clear of the container and a second position with the open end of said tube located within a container stopped by said indexing stop, (d) organic vapor detection means in fluid communication with said tube, the organic vapor detection means comprising a hollow sealed flame detection cell including an ionizing flame burner tip and adjacent collector, the tube being in fluid communication with the interior of said cell, a source of combustible gas connected to the burner tip of said cell, heating means for the connection between the cell and source of combustible gas to prevent condensation of vapor within the connection, and an electrometer wired to the collector of said cell to detect the presence of an ionization current within the cell, (e) and means to deliver a sample of atmosphere through said tube to said organic vapor detection means.

11. An apparatus for detecting the presence of organic contaminants in open end containers, such as bottles, jars and the like used for packaging foodstuffs, the apparatus used with a conveyor for carrying containers in a line with the open end of each container directed identically, the apparatus comprising;

(a) an open tube movably mounted adjacent to the conveyor, (b) an indexing stop mounted adjacent to said conveyor to selectively stop each container adjacent said tube with the open end of the container aligned with the tube open end, (c) power means operatively connected to said tube to selectively move said tube between a first position clear of a container and a second position with the open end of said tube located within a container stopped by said indexing stop, (d) organic vapor detection means in fluid communication with said tube, (e) means to deliver a sample of atmosphere through said tube to said organic vapor detection means, (f) container rejection means mounted adjacent to said conveyor to prevent use of a container stopped by said indexing stop after detection of an organic vapor contaminant in a sample of atmosphere withdrawn therefrom, the container rejection means being a power cylinder operated puncturing tool to puncture the wall of any container detected to have organic vapors therein.

References Cited

UNITED STATES PATENTS

| | | | |
|---|---|---|---|
| 2,457,707 | 12/1948 | Neuman et al. | 73—52 X |
| 3,086,848 | 4/1963 | Reinecke | 23—254 |
| 3,101,848 | 8/1963 | Uhlig | 209—72 |
| 3,127,773 | 4/1964 | Blumenfeld | 73—423 |
| 3,203,248 | 8/1965 | Stutler et al. | 73—421.5 |
| 3,243,991 | 4/1966 | Konig et al. | 73—23.1 X |
| 3,266,292 | 8/1966 | Bailey | 73—23 |

RICHARD C. QUEISSER, *Primary Examiner.*

J. FISHER, *Assistant Examiner.*